United States Patent
Iijima

(12) 
(10) Patent No.: US 6,738,115 B1
(45) Date of Patent: May 18, 2004

(54) REFLECTIVE LCD, SEMITRANSMITTING REFLECTIVE LCD AND ELECTRONIC DEVICE

(75) Inventor: Chiyoaki Iijima, Ina (JP)

(73) Assignee: Seiko Epson Corporation (JP)

( * ) Notice: Subject to any disclaimer, the term of this patent is extended or adjusted under 35 U.S.C. 154(b) by 242 days.

(21) Appl. No.: 09/869,719

(22) PCT Filed: Nov. 2, 2000

(86) PCT No.: PCT/JP00/07770

§ 371 (c)(1),
(2), (4) Date: Jun. 29, 2001

(87) PCT Pub. No.: WO01/33290

PCT Pub. Date: May 10, 2001

(30) Foreign Application Priority Data

Nov. 2, 1999 (JP) ............................... 11-312933
Jan. 6, 2000 (JP) ..................................... 2000-000933

(51) Int. Cl.$^7$ ............................................. G02F 1/1335
(52) U.S. Cl. ........................................ 349/113; 349/117
(58) Field of Search ................................. 349/117, 113

(56) References Cited

U.S. PATENT DOCUMENTS

| | | | |
|---|---|---|---|
| 5,124,824 A | 6/1992 | Kozaki et al. | 359/73 |
| 5,753,937 A | 5/1998 | Shimomaki et al. | 257/59 |
| 5,841,496 A | * 11/1998 | Itoh et al. | 349/113 |
| 6,456,347 B1 | * 9/2002 | Motomura | 349/117 |

FOREIGN PATENT DOCUMENTS

| | | |
|---|---|---|
| JP | 2-256021 | 10/1990 |
| JP | 5-181111 | 7/1993 |
| JP | 7-333598 | 12/1995 |
| JP | 8-114797 | 5/1996 |
| JP | 2000-258773 | 9/2000 |

OTHER PUBLICATIONS

Korean Examination Result.

* cited by examiner

*Primary Examiner*—John F. Niebling
*Assistant Examiner*—Andre' Stevenson
(74) *Attorney, Agent, or Firm*—Harness, Dickey & Pierce, P.L.C.

(57) ABSTRACT

A reflective liquid crystal device includes a reflecting electrode (14) provided on the liquid crystal side of a first substrate (10), and a first retardation plate (106), a second retardation plate (116) and a polarizer (105), which are provided on the side of a second substrate (20), which is opposite to the liquid crystal side thereof. The twist angle and Δnd of the liquid crystal are 230 to 260 degrees and 0.70 μm to 0.85 μm, respectively. Δnd of the first retardation plate is 150±50 μm, and Δnd of the second retardation plate is 610±60 nm. The angle formed by the transmission axis or absorption axis of the polarizer and the optical axis of the second retardation plate is 10 to 35 degrees, and the angle formed by the optical axis of the first retardation plate and the optical axis of the second retardation plate is 30 to 60 degrees. As a result, a bright image display having high contrast can be obtained.

9 Claims, 15 Drawing Sheets

Fig. 4

|  | Example 1 | Example 2 | Example 3 | Example 4 | Example 5 | Example 6 |
|---|---|---|---|---|---|---|
| Twist angle θt | 240° | 240° | | | 255° | |
| Δnd | | 0.81 μm | | | 0.76 μm | |
| R2 Δnd | 520 nm | 540 nm | 550 nm | 540 nm | 550 nm | 560 nm |
| R1 Δnd | 605 nm | 615 nm | 625 nm | 140 nm | 160 nm | 180 nm |
| Angle formed by absorption axis and optical axis of R2 θ1 | 25° | | | | 30° | |
| Angle formed by optical axes of R1 and R2 θ2 | 70° | | | | 70° | |
| Brightness in reflection | 32.5% | 32.2% | 32.9% | 24% | 25% | 26% |
| Contrast | 15 | 19 | 12 | 16 | 17 | 11 |

Fig. 7

|  | Example 7 | Example 8 | Example 9 | Example 10 | Example 11 | Example 12 |
|---|---|---|---|---|---|---|
| Twist angle θt | 240° | 240° | 240° | 240° | 255° | 255° |
| R2 Δnd | 0.81 μm | 0.81 μm | 0.79 μm | 0.79 μm | 0.74 μm | 0.74 μm |
| R2 Δnd | 650 nm | 660 nm | 610 nm | 620 nm | 550 nm | 560 nm |
| R1 Δnd | 190 nm | 180 nm | 160 nm | 170 nm | 130 nm | 120 nm |
| Angle formed by absorption axis and optical axis of R2  θ1 | 30° | 30° | 15° | 15° | 10° | 10° |
| Angle formed by optical axes of R1 and R2  θ2 | 30° | 30° | 40° | 40° | 50° | 50° |
| Brightness in reflection | 31% | 30% | 32% | 32% | 44% | 45% |
| Contrast | 18 | 19 | 17 | 18 | 20 | 21 |

(a)

(b)

(c)

(d)

REFLECTIVE LCD, SEMITRANSMITTING REFLECTIVE LCD AND ELECTRONIC DEVICE

TECHNICAL FIELD

The present invention relates to a passive matrix driving system liquid crystal device or the like, and an electronic apparatus using the same. Particularly, the present invention relates to an internal reflection system reflective liquid crystal device and transflective liquid crystal device respectively comprising a reflecting layer and a transflective layer provided on the liquid crystal side of a substrate, and an electronic apparatus using such a liquid crystal device.

BACKGROUND ART

A reflective liquid crystal device utilizing external light for display without using a light source such as a back light is conventionally advantageous from the viewpoint of reduction in power consumption, reduction in size and weight, or the like, and is thus used for portable electronic apparatuses, in which particularly, portability is regarded as important, such as a portable telephone, a wristwatch, an electronic notebook, a notebook-size personal computer, etc. A conventional reflective liquid crystal device comprises a liquid crystal held between a pair of substrates, and a reflector provided on the back of a liquid crystal panel, for reflecting external light incident on the surface side through the liquid crystal panel, a polarizer, etc. However, in this liquid crystal device, parallax occurs in a display image due to the long optical path from the liquid crystal separated by the substrates or the like to the reflector, thereby causing double exposure. In a color display, color lights are mixed by the long optical path to cause difficulties in displaying a high-quality image. In addition, since external light attenuates during the time from incidence on the liquid crystal to return from the reflector, a bright display is basically difficult.

Therefore, an internal reflection system reflective liquid crystal device has recently been developed, in which a display electrode formed on a substrate located at the side opposite to the external light incidence side is also used as a reflector to bring the reflection position near a liquid crystal layer. More specifically, Japanese Unexamined Patent Application Publication No. 8-114799 discloses the technique of forming a pixel electrode used as a reflector on a substrate.

On the other hand, a transflective liquid crystal device utilizes external light for visualizing a display, and thus a display cannot be read in a dark place. Therefore, a transflective liquid crystal display device is proposed in Japanese Unexamined Utility Model Publication No. 57-049271 and Japanese Unexamined Patent Application Publication No. 8-292413, in which like the conventional reflective liquid crystal device, external light is utilized in a light place, while an internal light source is used for visualizing a display in a dark place.

However, in these liquid crystal devices, the transflective plate, the back light, etc. are arranged on the outer plane of the liquid crystal panel on the side opposite to the observation side, and a transparent substrate is interposed between the liquid crystal layer and the transflective plate, thereby causing double exposure, blurring in display, or the like. Furthermore, a combination with a color filter produces double exposure, blurring in display, or the like due to parallax to cause the problem of failing to obtain sufficient coloring. Therefore, a transflective liquid crystal device is proposed in Japanese Unexamined Patent Application Publication No. 7-318929, in which a pixel electrode serving as a transflective film is provided on the inner surface of a liquid crystal cell.

DISCLOSURE OF INVENTION

However, in the reflective liquid crystal device disclosed in Japanese Unexamined Patent Application Publication No. 8-114799, it is very difficult to simultaneously increase brightness and the contrast ratio. Particularly, in a color display, the use of one or a plurality of retardation plates (retardation film) for color correction has the problem of causing a great difficulty in precise color correction at the same time as increases in brightness and contrast ratio.

On the other hand, in the transflective liquid crystal device disclosed in Japanese Unexamined patent Application Publication No. 7-318929, it is very difficult to simultaneously increase brightness and the contrast ratio in a reflective display. Particularly, in a color display, the use of one or a plurality of retardation plates (retardation film) for color correction has the problem of causing a great difficulty in precise color correction at the same time as increases in brightness and contrast ratio in a reflective display.

Although the applicant of this application proposes a novel transflective liquid crystal device in Japanese Patent Application No. 10-160866, this liquid crystal device has a problem in which particularly in a reflective display, a sufficient reflectance cannot be obtained to produce a dark display.

The present invention has been achieved in consideration of the above problems, and a technical object of the present invention is to provide a reflective liquid crystal device suitable for color display which exhibits increased brightness and contrast ratio, a transflective liquid crystal device suitable for color display which exhibits increased brightness and contrast ratio, particularly, in reflective display, and an electronic apparatus comprising a liquid crystal device comprising the reflective or transflective liquid crystal device.

In order to achieve the technical object, in a first aspect of the present invention, a reflective liquid crystal device comprises a first substrate, a transparent second substrate opposed to the first substrate, a liquid crystal held between the first and second substrates, a reflecting electrode layer arranged on the first substrate opposite to the second substrate, a polarizer provided on the side of the second substrate, which is opposite to the first substrate side thereof, a first retardation plate arranged between the polarizer and the second substrate, and a second retardation plate arranged between the polarizer and the first retardation plate, wherein the twist angle of the liquid crystal is 230 to 260 degrees, the minimum and maximum $\Delta nd$ (product of optical anisotropy $\Delta n$ and thickness d) of the liquid crystal are 0.85 $\mu m$ or less and 0.70 $\mu m$ or more, respectively, $\Delta nd$ of the first retardation plate is 150±50 nm or 600±50 m, $\Delta nd$ of the second retardation plate is 550±50 nm, the angle $\theta 1$ formed by the transmission axis or absorption axis of the polarizer and the optical axis of the second retardation plate is 15 to 35 degrees, and the angle $\theta 2$ formed by the optical axis of the first retardation plate and the optical axis of the second retardation plate is 60 to 80 degrees.

In order to achieve the technical object, in a second aspect of the present invention, a reflective liquid crystal device comprises a first substrate, a transparent second substrate opposed to the first substrate, a liquid crystal held between the first and second substrates, a reflecting electrode layer arranged on the side of the first substrate opposite to the second substrate, a polarizer provided on the side of the second substrate, which is opposite to the first substrate side thereof, a first retardation plate arranged between the polarizer and the second substrate, and a second retardation plate arranged between the polarizer and the first retardation plate, wherein the twist angle of the liquid crystal is 230 to 260 degrees, the minimum and maximum Δnd of the liquid crystal are 0.85 μm or less and 0.70 μm or more, respectively, Δnd of the first retardation plate is 150±50 nm, Δnd of the second retardation plate is 610±60 nm, the angle θ1 formed by the transmission axis or absorption axis of the polarizer and the optical axis of the second retardation plate is 10 to 35 degrees, and the angle θ2 formed by the optical axis of the first retardation plate and the optical axis of the second retardation plate is 30 to 60 degrees.

In the reflective liquid crystal device in each of the first and second aspects of the present invention, external light incident on the polarizer side is reflected by the reflecting electrode layer provided on the first substrate through the polarizer, the transparent second substrate, and the liquid crystal, and is again emitted from the polarizer side through the liquid crystal, the second substrate and the polarizer. Therefore, the intensity of external light emitted as display light through the liquid crystal after reflection by the reflecting electrode layer can be controlled, for example, by controlling the orientation state of the liquid crystal using an electric field between the reflecting electrode layer (reflecting electrode) provided on the first substrate and the transparent electrode (counter electrode) provided on the second substrate. The presence of the transparent substrate between the liquid crystal and the reflector prevents the occurrence of double exposure and blurring of display, thereby permitting the achievement of sufficient coloring even in a color display. By using the two retardation plates including the first and second retardation plates arranged between the polarizer and the second substrate, color correction can easily and precisely be performed. The reflecting electrode layer means a single layer or multilayer film having both the reflecting function and the electrode function.

Since the twist angle of the liquid crystal is 230 to 260 degrees, a high contrast ratio, for example, of as high as "10" can be realized. At the same time, since the minimum and maximum Δnd of the liquid crystal are 0.85 μm or less and 0.70 μm or more, respectively, a change in transmittance with the applied voltage of the liquid crystal can be made monotonous (i.e., monotonous increase or monotonous decrease) in a relatively wide operating temperature range, which is required according to the specifications of the device, permitting accurate grayscale display.

Furthermore, in the reflective liquid crystal device in the first aspect, Δnd of the first retardation plate is 150±50 nm or 600±50 m (i.e., 100 to 200 nm or 550 to 650 nm), and Δnd of the second retardation plate is 550±50 nm (i.e., 500 to 600 nm), and thus the situation that a black display is reddened or blued can be effectively avoided. In addition, since the angle θ1 (i.e., the angle formed by the transmission axis or absorption axis of the polarizer and the optical axis of the second retardation plate) is 15 to 35 degrees, and the angle θ2 (i.e., the angle formed by the optical axis of the first retardation plate and the optical axis of the second retardation plate) is 60 to 80 degrees, the brightness and contrast ratio can be increased simultaneously, and the use of the two retardation plates permits a high-quality reflective display in which color correction is precisely performed in color display or monochromatic display.

On the other hand, in the reflective liquid crystal device in the second aspect, Δnd of the first retardation plate is 150±50 nm (i.e., 100 to 200 nm), and Δnd of the second retardation plate is 610±60 nm (i.e., 550 to 670 nm), and thus the situation that a black display is reddened or blued can be effectively avoided. In addition, since the angle θ1 is 10 to 35 degrees, and the angle θ2 is 30 to 60 degrees, the brightness and contrast ratio can be increased simultaneously, and the use of the two retardation plates permits a high-quality reflective display in which color correction is precisely performed in color display or monochromatic display.

In an embodiment of the first or second aspect of the present invention, in the reflective liquid crystal device, Δnd of the liquid crystal is 0.70 to 0.85 μm.

In this embodiment, since Δnd of the liquid crystal is 0.70 to 0.85 μm (i.e., the minimum and maximum Δnd of the liquid crystal are 0.70 μm or more and 0.85 μm or less, respectively), a change in transmittance with the applied voltage of the liquid crystal can be easily made monotonous in a wide operating temperature range which is required according to the specifications of the device, permitting accurate grayscale display.

In the reflective liquid crystal device in the first or second aspect of the present invention, particularly, when the thickness d of the liquid crystal is constant within the image display region or the aperture region of each pixel, good results (i.e., the good change in transmittance and grayscale display) can be obtained under the condition of Δnd of 0.70 to 0.85 μm. However, for example, when the thickness d of the liquid crystal is not constant over the entire region of each pixel because unevenness is formed on the surface of the reflecting electrode layer consciously from a design viewpoint or unconsciously, it is made difficult or impossible to set Δnd of the liquid crystal within the range of 0.70 to 0.85 μm over the entire region of each pixel. In this case, as described above, Δnd of the liquid crystal is set so that the minimum is 0.85 m or less, and the maximum is 0.70 μm or more, thereby obtaining practically sufficient results (i.e., the good change in transmittance and grayscale display).

In another embodiment of the first or second aspect of the present invention, the reflective liquid crystal device further comprises a color filter provided on the liquid crystal side of the first or second substrate.

In this embodiment, the intensity of external light emitted as display light through the liquid crystal after reflection by the reflecting electrode layer can be controlled by controlling the orientation state of the liquid crystal using the reflecting electrode layer. Since reflected light is reflected through the color filter, a color reflective display can be performed. In this case, the use of the two retardation plates arranged between the polarizer and the second substrate permits relatively easy and accurate color correction. As a result, brightness and the contrast ratio can be simultaneously increased, and a high-quality color reflective display with high color reproducibility can be performed.

In still another embodiment of the first or second aspect of the present invention, in the reflective liquid crystal device, the reflecting electrode layer comprises a single-layer reflecting electrode.

In this embodiment, the intensity of external light emitted as display light through the liquid crystal after reflection by the reflecting electrode provided on the first substrate can be controlled by controlling the orientation state of the liquid crystal using the reflecting electrode. The reflecting electrode may comprise a metal film, for example, of Al (aluminum)

In a further embodiment of the first or second aspect of the present invention, in the reflective liquid crystal device, the reflecting electrode layer has a laminated structure comprising a reflecting film, a transparent insulating film arranged on the reflecting film, and a transparent electrode arranged on the insulating film.

In this embodiment, the intensity of external light emitted as display light through the liquid crystal after reflection by the reflecting film can be controlled by controlling the orientation state of the liquid crystal using the transparent electrode laminated on the first substrate. The transparent electrode may comprise, for example, an ITO (Indium Tin Oxide) film, and the insulating film may comprise, for example, silicon oxide as a main component. On the other hand, the reflecting film may comprise, for example, a metal film of Al.

In a further embodiment of the first or second aspect of the present invention, the reflective liquid crystal device uses a passive matrix driving system in a normally black mode.

In this embodiment, the passive matrix driving system in the normally black mode using, for example, a STN liquid crystal, enables a high-quality reflective display exhibiting high brightness and contrast ratio, and accurate color correction in a color display.

In a further embodiment of the first or second aspect of the present invention, in the reflective liquid crystal device, unevenness is formed on the surface of the first substrate opposite to the second substrate.

In this embodiment, external light reflected through the liquid crystal is reflected by the reflecting electrode layer which is formed on the uneven surface of the substrate to have unevenness, whereby optimum reflection properties can be obtained by controlling the size and shape of the unevenness, or the like. Therefore, a bright high-quality display can be finally obtained. As the method of forming the unevenness, for example, the method of forming an uneven surface of the first substrate, or the method of forming an uneven film on the surface of the flat first substrate may be used. Furthermore, the reflecting electrode layer may be formed in an uneven shape on the flat first substrate.

In order to achieve the technical object, in a first aspect of the present invention, a transflective liquid crystal device comprises a first transparent substrate, a second transparent substrate opposed to the first substrate, a liquid crystal held between the first and second substrates, a light source provided on the side of the first substrate, which is opposite to the liquid crystal side thereof, a transflective electrode layer arranged on the side of the first substrate opposite to the second substrate, a polarizer provided on the side of the second substrate, which is opposite to the first substrate side thereof, a first retardation plate arranged between the polarizer and the second substrate, and a second retardation plate arranged between the polarizer and the first retardation plate, wherein the twist angle of the liquid crystal is 230 to 260 degrees, the minimum and maximum Δnd of the liquid crystal are 0.85 μm or less and 0.70 μm or more, respectively, Δnd of the first retardation plate is 150±50 nm or 600±50 m, Δnd of the second retardation plate is 550±50 nm, the angle θ1 formed by the transmission axis or absorption axis of the polarizer and the optical axis of the second retardation plate is 15 to 35 degrees, and the angle θ2 formed by the optical axis of the first retardation plate and the optical axis of the second retardation plate is 60 to 80 degrees.

In order to achieve the technical object, in a second aspect of the present invention, a transflective liquid crystal device comprises a first transparent substrate, a second transparent substrate opposed to the first substrate, a liquid crystal held between the first and second substrates, a light source provided on the side of the first substrate, which is opposite to the liquid crystal side thereof, a transflective electrode layer arranged on the side of the first substrate opposite to the second substrate, a polarizer provided on the side of the second substrate, which is opposite to the first substrate side thereof, a first retardation plate arranged between the polarizer and the second substrate, and a second retardation plate arranged between the polarizer and the first retardation plate, wherein the twist angle of the liquid crystal is 230 to 260 degrees, the minimum and maximum Δnd of the liquid crystal are 0.85 μm or less and 0.70 μm or more, respectively, Δnd of the first retardation plate is 150±50 nm, Δnd of the second retardation plate is 610±60 nm, the angle θ1 formed by the transmission axis or absorption axis of the polarizer and the optical axis of the second retardation plate is 10 to 35 degrees, and the angle θ2 formed by the optical axis of the first retardation plate and the optical axis of the second retardation plate is 30 to 60 degrees.

In the transflective liquid crystal device in each of the first and second aspects of the present invention, in a reflective display, external light incident on the polarizer side is reflected by the transflective electrode layer provided on the first substrate through the polarizer, the second transparent substrate, and the liquid crystal, and is again emitted from the polarizer side through the liquid crystal, the second substrate and the polarizer. Therefore, the intensity of external light emitted as display light through the liquid crystal after reflection by the transflective electrode layer provided on the first substrate can be controlled, for example, by controlling the orientation state of the liquid crystal using an electric field between the transflective electrode layer (transflective electrode) and the transparent electrode (counter electrode) provided on the second substrate. The presence of the transparent substrate between the liquid crystal and the reflector prevents the occurrence of double exposure and blurring of display, thereby permitting the achievement of sufficient coloring even in a color display. By using the two retardation plates including the first and second retardation plates arranged between the polarizer and the second substrate, color correction can easily and precisely be performed. The transflective electrode layer represents a single layer or multilayer film having both the transflective function and the electrode function.

On the other hand, in a transmissive display, light emitted from the light source and transmitted through the transmission region of the transflective electrode layer from the first substrate side is emitted from the polarizer side through the liquid crystal, the second substrate and the polarizer. Therefore, for example, when another polarizer is arranged between the first substrate and the light source so that the transmission axis and the absorption axis have the predetermined relations with the polarizer provided on the second substrate, the intensity of source light emitted as display light through the liquid crystal after transmission through the transflective electrode layer provided on the first substrate can be controlled, for example, by controlling the orientation state of the liquid crystal using an electric field between the transflective electrode layer (transflective electrode) and the transparent electrode (counter electrode) provided on the second substrate.

Since the twist angle of the liquid crystal is 230 to 260 degrees, a high contrast ratio, for example, of as high as "10" can be realized. At the same time, since the minimum and maximum Δnd of the liquid crystal are 0.85 μm or less and 0.70 μm or more, respectively, a change in transmittance with the applied voltage of the liquid crystal can be made monotonous (i.e., monotonous increase or monotonous decrease) in a relatively wide operating temperature range, which is required according to the specifications of the device, permitting accurate grayscale display.

Furthermore, in the transflective liquid crystal device in the first aspect, Δnd of the first retardation plate is 150±50 nm (i.e., 100 to 200 nm) or 600±50 m (i.e., 550 to 650 nm), and Δnd of the second retardation plate is 550±50 nm (i.e., 500 to 600 nm), and thus the situation that a black display is reddened or blued can be effectively avoided. In addition, since the angle θ1 (i.e., the angle formed by the transmission axis or absorption axis of the polarizer and the optical axis of the second retardation plate) is 15 to 35 degrees, and the angle θ2 (i.e., the angle formed by the optical axis of the first retardation plate and the optical axis of the second retardation plate) is 60 to 80 degrees, the brightness and contrast ratio can be increased simultaneously, and the use of the two retardation plates permits a high-quality reflective display in which color correction is precisely performed in color display or monochromatic display.

On the other hand, in the transflective liquid crystal device in the second aspect, Δnd of the first retardation plate is 150±50 nm (i.e., 100 to 200 nm), and Δnd of the second retardation plate is 610±60 nm (i.e., 550 to 670 nm), and thus the situation that a black display is reddened or blued can be effectively avoided. In addition, since the angle θ1 is 10 to 35 degrees, and the angle θ2 is 30 to 60 degrees, the brightness and contrast ratio can be increased simultaneously, and the use of the two retardation plates permits a high-quality display in which color correction is precisely performed in color display or monochromatic display.

In an embodiment of the first or second aspect of the present invention, in the transflective liquid crystal device, Δnd of the liquid crystal is 0.70 to 0.85 μm.

In this embodiment, since Δnd of the liquid crystal is 0.70 to 0.85 μm (i.e., the minimum and maximum Δnd of the liquid crystal are 0.70 μm or more and 0.85 μm or less, respectively), a change in transmittance with the applied voltage of the liquid crystal can be easily made monotonous in a wide operating temperature range which is required according to the specifications of the device, permitting accurate grayscale display.

In the transflective liquid crystal device in the first or second aspect of the present invention, particularly, when the thickness d of the liquid crystal is constant within the image display region or the aperture region of each pixel, good results can be obtained under the condition of Δnd of 0.70 to 0.85 μm. However, for example, when the thickness d of the liquid crystal is not constant over the entire region of each pixel, it is made difficult or impossible to set Δnd of the liquid crystal within the range of 0.70 to 0.85 μm over the entire region of each pixel. In this case, as described above, Δnd of the liquid crystal is set so that the minimum is 0.85 μm or less, and the maximum is 0.70 μm or more, thereby obtaining practically sufficient results.

In another embodiment of the first or second aspect of the present invention, the transflective liquid crystal device further comprises a color filter provided on the liquid crystal side of the first or second substrate.

In this embodiment, in a reflective display, the intensity of external light emitted as display light through the liquid crystal after reflection by the transflective electrode layer provided on the first substrate can be controlled by controlling the orientation state of the liquid crystal using the transflective electrode layer. Since reflected light is reflected through the color filter, a color reflective display can be performed. On the other hand, in a transmissive display, the intensity of source light emitted as display light through the liquid crystal after transmission through the transflective electrode layer provided on the first substrate can be controlled by controlling the orientation state of the liquid crystal using the transflective electrode layer. Since source light is reflected through the color filter, a color transmissive display can be performed. As a result, brightness and the contrast ratio can be simultaneously increased, and a high-quality color display with high color reproducibility can be performed.

In still another embodiment of the first or second aspect of the present invention, in the transflective liquid crystal device, the transflective electrode layer comprises a reflecting layer having slits formed therein.

In this embodiment, in a reflective display, the intensity of external light emitted as display light through the liquid crystal after reflection by the reflecting electrode can be controlled by controlling the orientation state of the liquid crystal using the reflecting layer having the slits formed therein and provided on the first substrate. In a transmissive display, the intensity of source light emitted as display light through the liquid crystal after transmission through the slits can be controlled by controlling the orientation state. The reflecting electrode may comprise a metal film, for example, of Al (aluminum). Besides the reflective layer having the slits formed therein, for example, reflecting layers separated from each other in a plan view from the direction perpendicular to the second substrate so that light can be transmitted through the spaces between the respective reflecting layers, or a reflecting layer having a plurality of regular or irregular apertures through which light can be transmitted can be used as the transflective electrode layer.

In this embodiment, the width of each of the slits may be 3 to 20 μm.

In this construction, a bright display with a high contrast can be performed in both reflective and transmissive displays.

In a further embodiment of the first or second aspect of the present invention, in the transflective liquid crystal device, the transflective electrode layer has a laminated structure comprising a transflective film, a transparent insulating film arranged on the transflective film, and a transparent electrode arranged on the insulating film.

In this embodiment, in a reflective display, the intensity of external light emitted as display light through the liquid crystal after reflection by the transflective film can be controlled by controlling the orientation state of the liquid crystal using the transparent electrode laminated on the transflective film on the first substrate. In a transmissive display, the intensity of source light emitted as display light through the liquid crystal after transmission through the transflective film and the transparent electrode can be controlled by controlling the orientation state. The transparent electrode may comprise, for example, an ITO film, and the insulating film may comprise, for example, silicon oxide as a main component. On the other hand, the transflective film may comprise a metal film of Al or the like in which for example, slits or apertures are provided.

In a further embodiment of the first or second aspect of the present invention, the transflective liquid crystal device uses a passive matrix driving system in a normally black mode.

In this embodiment, the passive matrix driving system in the normally black mode using, for example, a STN liquid crystal, enables a high-quality display exhibiting high brightness and contrast ratio, and accurate color correction in a color display or monochromatic display.

In a further embodiment of the first or second aspect of the present invention, the transflective liquid crystal device further comprises another polarizer arranged between the first substrate and the light source, and another retardation plate arranged between the first substrate and the other polarizer.

In this embodiment, when both polarizers are arranged so that the transmission axis of the polarizer on the second substrate side and the transmission axis of the polarizer on the first substrate side have a predetermined relation, in a transmissive display, source light (transmitted light) emitted from the polarizer on the second substrate side can be modulated by a change in the orientation state of the liquid crystal with the applied voltage. Furthermore, in a transmissive display, color correction can relatively easily be performed by the other retardation plate on the second substrate side.

In a further embodiment of the first or second aspect of the present invention, in the transflective liquid crystal device, unevenness is formed on the surface of the first substrate opposite to the second substrate.

In this embodiment, external light reflected through the liquid crystal is reflected by the transflective electrode layer which is formed on the uneven surface of the substrate to have unevenness, whereby optimum reflection properties can be obtained by controlling the size and shape of the unevenness, or the like. Therefore, a bright high-quality display can be finally obtained. As the method of forming the unevenness, for example, the method of forming an uneven surface of the first substrate, or the method of forming an uneven film on the surface of the flat first substrate may be used. Furthermore, the transflective electrode layer may be formed in an uneven shape on the flat first substrate.

In order to achieve the technical object of the present invention, an electronic apparatus comprises the reflective liquid crystal device in the first or second aspect of the present invention, or a transflective liquid crystal in the first or second aspect of the present invention (including the embodiments thereof).

The electronic apparatus of the present invention enables the realization of various electronic apparatuses such as a portable telephone, a wristwatch, an electronic notebook, a personal computer, etc., each of which uses a reflective liquid crystal device capable of performing reflective display having brightness and high contrast without causing double exposure and display blurring due to parallax, or a transflective liquid crystal device capable of performing display by switching a high-contrast reflective display and transmissive display.

The operation and other advantages of the present invention will be made clear from the description of the embodiments below.

BRIEF DESCRIPTION OF THE DRAWINGS

FIG. 4 is a table showing the parameter settings, brightness and contrast ratios in Examples 1 to 6 based on the first embodiment.

FIG. 7 is a table showing the parameter settings, brightness and contrast ratios in Examples 7 to 12 based on a second embodiment.

BEST MODE FOR CARRYING OUT THE INVENTION

Embodiments in the best mode for carrying out the present invention will be described in order based on the drawings.

The embodiments of the present invention will be described below based on the drawings.

First Embodiment

Figure 1:
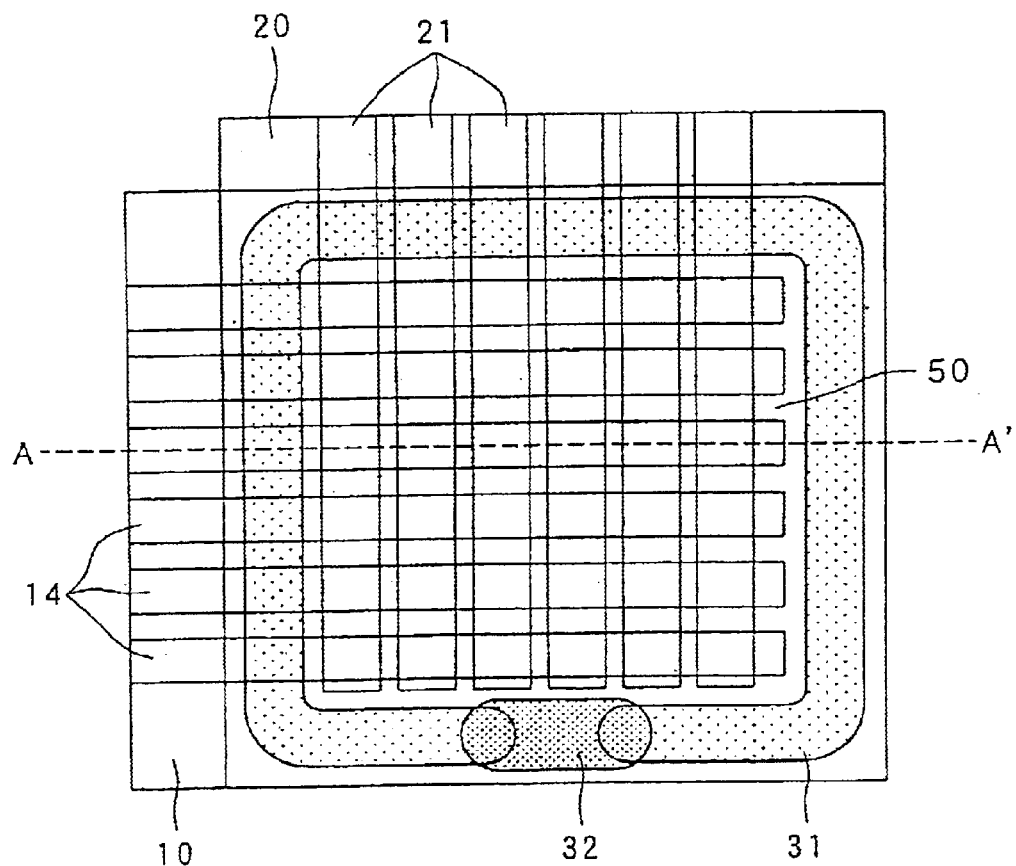
FIG. 1 is a schematic plan view showing a passive matrix driving system reflective liquid crystal device in accordance with a first embodiment in the best mode for carrying out the present invention, in which a color filter formed on a counter substrate is removed for the sake of convenience, as viewed from the counter substrate side.
Figure 2:
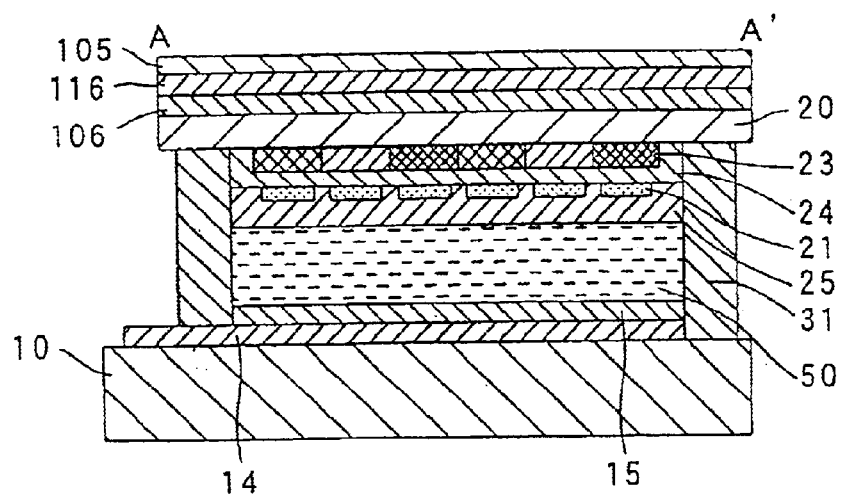
FIG. 2 is a schematic sectional view of the reflective liquid crystal device including the color filter, taken along line A–A' of FIG. 1.
Figure 3:
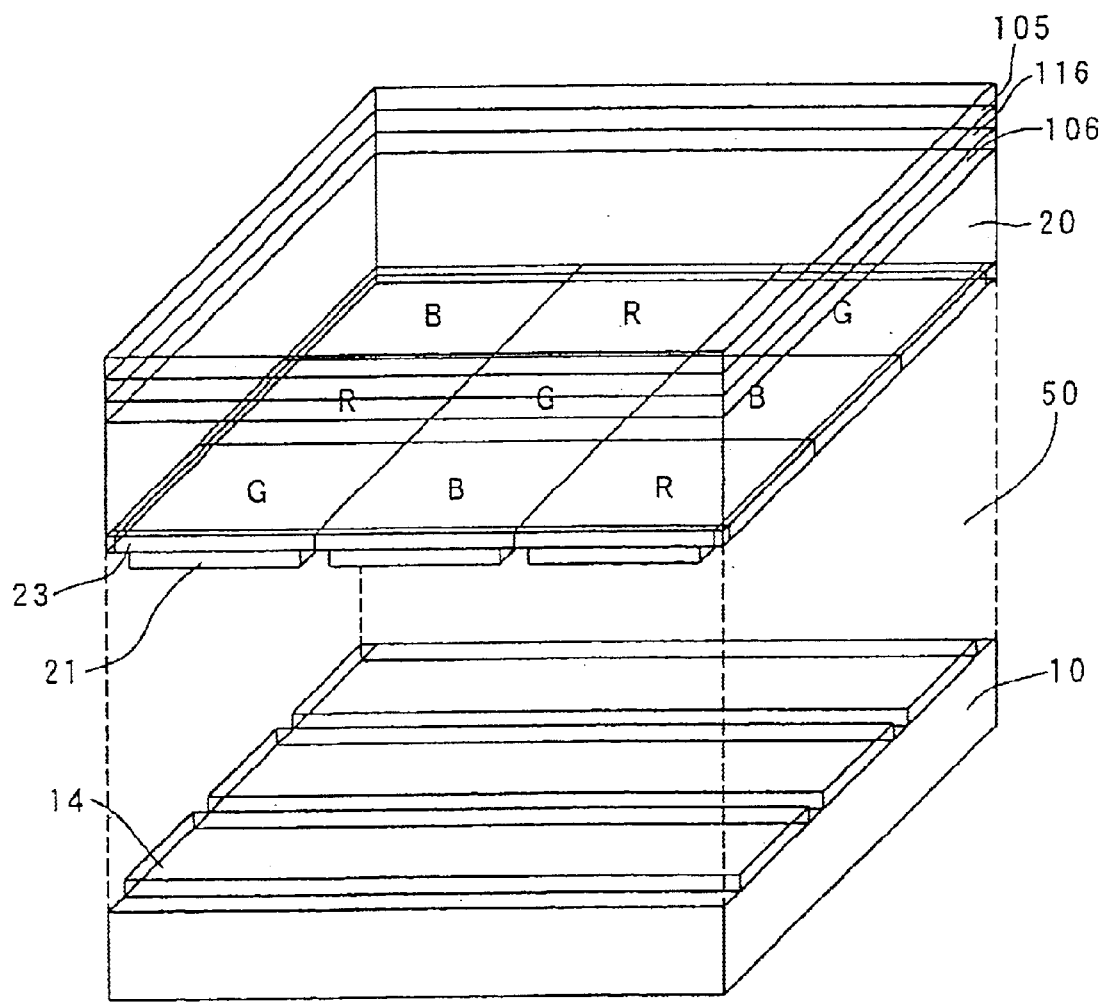
FIG. 3 is a partial perspective view of the reflective liquid crystal device of the first embodiment.

The construction of a reflective liquid crystal device in accordance with a first embodiment of the present invention is described with reference to FIGS. 1 to 3. In the first embodiment, the present invention is applied to a passive matrix driving system reflective liquid crystal device. FIG. 1 is a schematic plan view showing the reflective liquid crystal device in which a color filter formed on a counter substrate is removed for the sake of convenience, as viewed from the counter substrate side. FIG. 2 is a schematic sectional view of the reflective liquid crystal device including the color filter, taken along line A–A' of FIG. 1. FIG. 3 is a partial perspective view of the reflective liquid crystal device. Although FIG. 1 schematically shows six stripe electrodes each in the longitudinal and transverse directions for the sake of convenient description, many electrodes are actually present. FIG. 2 shows layers and members on different reduction scales in order to make each of the layers and the embodiments recognizable. In FIG. 3, the three stripe electrodes each in the longitudinal and transverse directions are enlarged.

In FIGS. 1 to 3, the reflective liquid crystal device of the first embodiment comprises a first substrate 10, a second transparent substrate 20 opposed to the first substrate 10, a liquid crystal layer 50 held between the first substrate 10 and the second substrate 20, a plurality of stripe reflecting electrodes 14 arranged on the side (i.e., the upper surface in FIG. 2) of the first substrate 10 opposite to the second substrate 20, and an alignment film 15 arranged on the reflecting electrodes 14. The reflective liquid crystal device further comprises a color filter 23 arranged on the side (i.e., the lower surface in FIG. 2) of the second substrate opposite to the first substrate 10, a color filter planarizing film 24 arranged on the color filter 23, a plurality of stripe transparent electrodes 21 arranged on the color filter planarizing film 24 to cross the reflecting electrodes 14, and an alignment film 25 arranged on the transparent electrodes 21. The color filter 23 may be formed between the reflecting electrodes 14 and the first substrate 10. Also, the color filter 23 comprises RGB (red, green, blue) color portions which are arranged in respective pixels in the predetermined order in correspondence with the plane regions at the intersections of the reflecting electrodes 14 and the transparent electrodes 21 (refer to FIG. 3).

The first substrate 10 and the second substrate 20 are bonded together with a sealing agent 31 provided in the periphery of the liquid crystal layer 50 (refer to FIGS. 1 and 2), and the liquid crystal layer 50 is sealed between the first substrate 10 and the second substrate 20 by the sealing agent 31 and a sealant 32. The reflective liquid crystal device further comprises a polarizer 105, a first retardation plate 106 and a second retardation plate 116, which are provided on the side of the second substrate 20, which is opposite to the liquid crystal layer 50 side thereof.

Since the first substrate 10 is not required to have transparency, for example, a quartz substrate, a semiconductor substrate, can be used. However, the second substrate 20 is required to be transparent or at least translucent to visible light, and for example, a glass substrate, a quartz substrate can be thus used.

Each of the reflecting electrodes 14 comprises a reflecting film composed of, for example, Al as a main component, and is formed by vapor deposition, sputtering, or the like. On the other hand, each of the transparent electrodes 21 comprises a transparent conductive thin film, for example, such as an ITO film.

Each of the alignment films 15 and 25 comprises an organic thin film such as a polyimide thin film, and is formed by spin coating or flexo printing, and subjected to predetermined orientation treatment such as rubbing.

With no electric field applied between the reflecting electrodes 14 and the transparent electrodes 21, the liquid crystal layer 50 assumes a predetermined orientation state by means of the alignment films 15 and 25. For example, the liquid crystal layer 50 comprises a STN liquid crystal comprising a nematic liquid crystal or a mixture of several nematic liquid crystals.

The sealing agent 31 comprises an adhesive composed of, for example, a photosetting resin or thermosetting resin. Particularly, in the reflective liquid crystal device of a small size having a diagonal of several inches or less, a gap material (spacer) such as glass fibers, glass beads, is mixed in the sealing material, for setting the space between both substrates to a predetermined value. However, in the reflective liquid crystal device of a large size having a diagonal of several inches to 10 inches or more, such a gap material may be mixed in the liquid crystal layer 50. The sealant 32 comprises a resin adhesive for sealing an inlet of the sealing material 32 after the liquid crystal is injected under vacuum through the inlet.

The color filter 23 comprises coloring material films which respectively transmit blue (B), green (G) and red (R) lights, and which are respectively arranged in the pixels to have a delta arrangement, a stripe arrangement, a mosaic arrangement, a triangle arrangement, or the like. Furthermore, a light shielding film referred to as a "black mask" or "black matrix" is formed in the boundaries between the respective pixels to prevent color mixing between the respective pixels.

Although not shown in FIGS. 1 and 2, a frame made of the same material as or a different material from the light shielding film in the color filter 23 is formed in parallel with the inside of the sealing material 32 to define the image display region. The frame may be formed on one or both of the second substrate 20 and the first substrate 10. Alternatively, the frame may be defined by the edge of a light shielding case in which the reflective liquid crystal device is contained.

In the first embodiment, particularly, the twist angle θt of the liquid crystal layer 50 comprising a STN liquid crystal is limited to 230 to 260 degrees, and the minimum and maximum Δnd (the product of optical anisotropy Δn and thickness d) of the liquid crystal are 0.85 μm or less and 0.70 μm or more, respectively (however, it is needless to say that the minimum is set to be lower than the maximum). The twist angle θt can be defined with high precision by the direction of rubbing of the alignment film 15 and the alignment film 25. The first retardation plate 106 has a Δnd of 150±50 nm or 600±50 nm, and the second retardation plate 116 has a Δnd of 550±50 nm. The angle θ1 formed by the transmission or absorption axis of the polarizer 105 and the optical axis of the second retardation plate 116 is 15 to 35 degrees, and the angle 62 formed by the optical axis of the first retardation plate 106 and the optical axis of the second retardation plate 116 is 60 to 80 degrees. Therefore, in the reflective liquid crystal device of the first embodiment, the reflectance for light near a wavelength of 550 nm is increased to permit a reflective color display with brightness and high contrast. Furthermore, the use of the two retardation plates enables accurate and easy color correction, and particularly a beautiful black display or white display (i.e., a black display or white display causing no redness, blueness or greenness).

Furthermore, since the minimum and maximum $\Delta$nd of the liquid crystal are 0.85 $\mu$m or less and 0.70 $\mu$m or more, respectively, a change in transmittance with the applied voltage of the liquid crystal device can be made monotonous (for example, monotonous increase in a normally black mode, and monotonous decrease in a normally white mode) in a relatively wide operating temperature range which is required according to the specifications of the device, thereby permitting accurate color grayscale display. Although, in this embodiment, the minimum and maximum $\Delta$nd of the liquid crystal are 0.85 $\mu$m or less and 0.70 $\mu$m or more, respectively, the $\Delta$nd of the liquid crystal may be simply set to 0.70 $\mu$m to 0.85 $\mu$m because of the flat uppermost surfaces (i.e., the surface of the alignment film 15 or the reflecting electrodes 14 provided below it) of both substrates, which define the thickness of the liquid crystal. On the other hand, when unevenness is formed on the uppermost surfaces of both substrates, which define the thickness of the liquid crystal, as described in the embodiments below (refer to third and fourth embodiments), it is made difficult or impossible to set the $\Delta$nd of the liquid crystal to 0.70 $\mu$m to 0.85 $\mu$m over the entire region of each pixel. In this case, as described above, $\Delta$nd of the liquid crystal may be set so that the minimum and maximum are 0.85 $\mu$m or less and 0.70 $\mu$m or more, respectively.

Next, the operation of the reflective liquid crystal device of the first embodiment constructed as described above is described with reference to FIG. 2. The reflective liquid crystal device is driven in a passive matrix driving system in a normally black mode.

In FIG. 2, external light incident on the polarizer 105 side (i.e., the upper side in FIG. 2) is reflected by the reflecting electrodes 14 provided on the first substrate 10 through the polarizer 105, the second transparent substrate 20, and the liquid crystal layer 50, and again emitted from the polarizer 105 through the liquid crystal layer 50, the second transparent substrate 20, and the polarizer 105. When an image signal and scanning signal are supplied to the reflecting electrodes 14 and the transparent electrodes 21 from an external circuit with predetermined timing, an electric field is successively applied to the portions of the liquid crystal layer 50 at the intersections of the reflecting electrodes 14 and the transparent electrodes 21 for each line, each column or each pixel. Therefore, the orientation state of the liquid crystal layer 50 can be controlled in pixels by the applied voltage to modulate the quantity of light transmitted through the polarizer 105 having the fixed transmission axis and absorption axis in pixels, thereby permitting color grayscale display.

In this embodiment, the presence of the transparent substrate between the liquid crystal layer and the reflector prevents the occurrence of double exposure, display blurring, or the like to obtain sufficient coloring even in a color display, as compared with a conventional reflective liquid crystal device in which light is reflected by a reflector provided on the outside of the first substrate. Furthermore, in this embodiment, external light is reflected by the reflecting electrodes 14 on the upper surface of the first substrate 10, thereby decreasing parallax in a display image by an amount corresponding to a decrease in the optical path and improve the brightness of the display image. Particularly, since the twist angle $\theta$t of the liquid crystal layer 50, the angles $\theta$1 and $\theta$2, $\Delta$nd of the liquid crystal, $\Delta$nd of the first retardation plate 106 and $\Delta$nd of the second retardation plate 116 lie in the above-described ranges, a color display having brightness and high contrast can be realized in the normally black mode.

In the above-described first embodiment, driving LSI comprising a data line driving circuit and a scanning line driving circuit mounted, for example, on a TAB (Tape Automated Bonding) substrate may be electrically and mechanically connected, through an anisotropic conductive film, to the terminals of the reflecting electrodes 14, which are led to the terminal portion of the first substrate 10, and the terminals of the transparent electrodes 21, which are led to the terminal portion of the second substrate 20, for supplying an image signal and scanning signal to the reflecting electrodes 14 and the transparent electrodes 21 with predetermined timing. Alternatively, the data line driving circuit and the scanning line driving circuit may be formed on the peripheral region of the first substrate 10 or second substrate 20 outside the sealing agent 31 to form a reflective liquid crystal with so-called built-in driving circuits. Furthermore, in order to inspect the quality, defects, etc. of the liquid crystal device in the course of manufacturing or at the time of shipping, an inspection circuit or the like may be formed to form a reflective liquid crystal with so-called built-in peripheral circuits.

In the first embodiment, besides the passive matrix driving system, various known driving systems such as a TFT (Thin Film Transistor) active matrix driving system, a TFD (Thin Film Diode) active matrix driving system, a segment driving system, can be used. In addition, a plurality of stripe or segment transparent electrodes is formed on the second substrate 20, or a transparent electrode is formed over substantially the entire surface of the second substrate 20 according to the driving system. Alternatively, driving may be performed by using transverse electric fields parallel to the first substrate 10, which are produced between the adjacent reflecting electrodes 14 on the first substrate 10, instead of providing the counter electrode on the second substrate 20. Besides the normally black mode, the normally white mode may be utilized. Furthermore, micro lenses may be formed on the second substrate 10 in one-to-one correspondence with pixels. In this case, a bright liquid crystal device can be realized by improving the converging efficiency of incident light. Furthermore, many interference layers having different refractive indexes may be formed on the second substrate 20 to form a dichroic filter using light interference for creating RGB colors. The counter substrate with the dichroic filter can realize a brighter color liquid crystal device.

In the first embodiment shown in FIG. 2, each of the reflecting electrodes 14 comprises a single layer composed of Al as a main component, and thus reflectance can be improved by a relatively simple manufacturing process at relatively low cost. However, even when another metal such as Ag (silver), Cr (chromium) is used as the main component of the reflecting electrodes 14, the same effect as the above-described first embodiment can be obtained.

Examples based on the first embodiment are described below with reference to FIGS. 4 to 6. FIG. 4 is a table showing the twist angle θt of the liquid crystal layer 50, Δnd of the liquid crystal layer 50, retardation Δnd of the second retardation plate 116 (represented by R2 Δnd in the table of FIG. 4, wherein Δn represents the optical anisotropy of the retardation plate, and d represents the thickness of the retardation plate), retardation Δnd of the first retardation plate 106 (represented by R1 Δnd in the table of FIG. 4), the angles θ1 and θ2, and brightness (reflectance) and contrast ratio in a reflective display in each of Examples 1 to 6.

In Examples 1 to 3, driving is performed in the normally black mode with 1/120 duty and 1/13 bias, while in Examples 4 to 6, driving is performed in the normally black mode with 1/240 duty and 1/13 bias.

Figure 5:
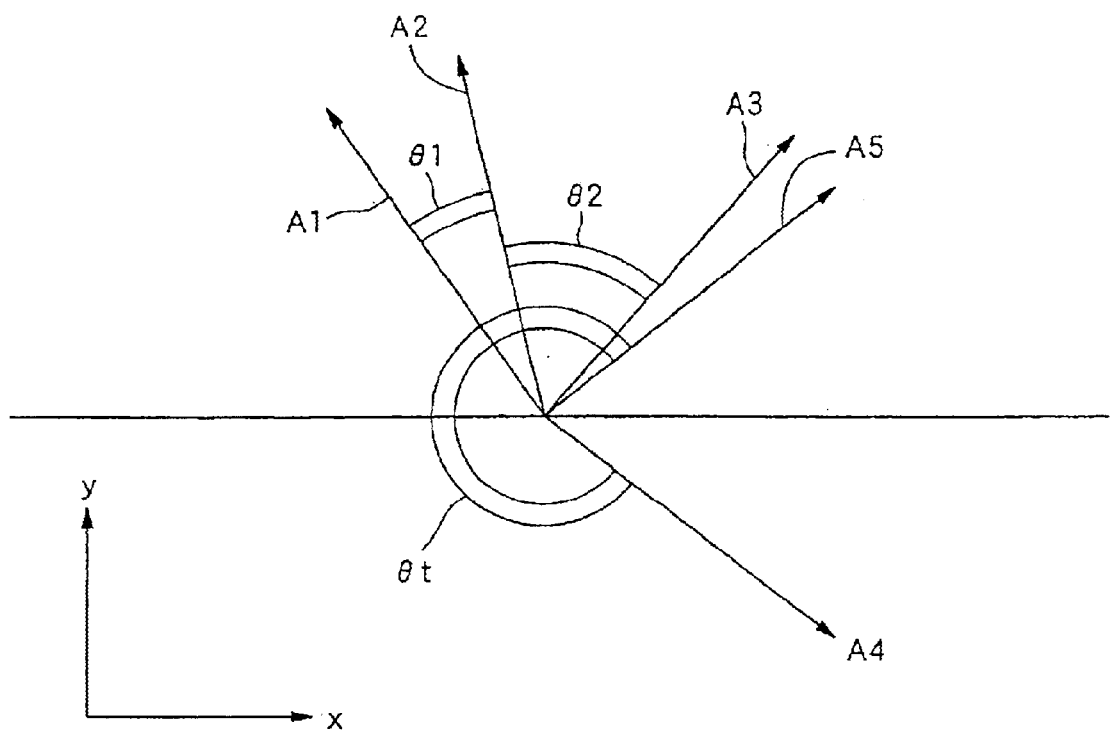
FIG. 5 is a drawing of a substrate surface for schematically illustrating an example of a relation between the angles set as parameters in the first embodiment.

For example, when the direction A1 of the absorption axis of the polarizer 105, the direction A2 of the lag axis of the second retardation plate 116, the direction A3 of the lag axis of the first retardation plate 106, the rubbing direction A4 of the alignment film 25, and the rubbing direction A5 of the alignment film 15 are set in this order from the incidence side according to the settings of the angles θ1, θ2 and θt in each of the examples, as shown in FIG. 5, a high reflectance (about 24 to 32%) and a high contrast ratio (about 11 to 19) can be obtained. In FIG. 5, the x direction is the direction (transverse direction) of extension of the stripe reflecting electrodes 14, and the y direction is the direction (longitudinal direction) of extension of the stripe transparent electrodes 21.

Figure 6:
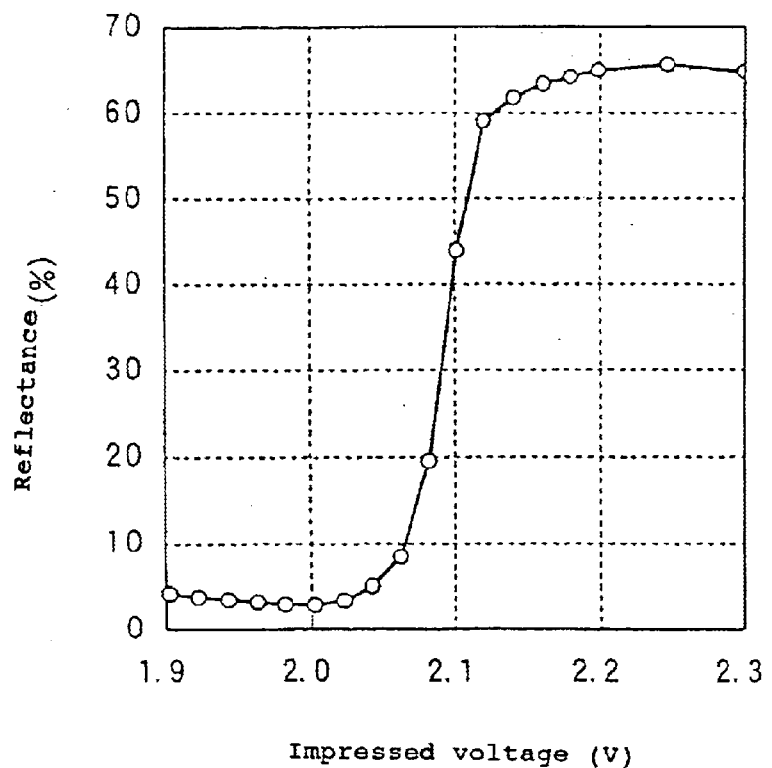
FIG. 6 is a characteristic diagram showing the reflectance versus the voltage applied to a liquid crystal in normally black mode driving of the first embodiment.

Furthermore, when the reflective liquid crystal device having the above parameter settings is driven in the normally black mode with 1/120 duty and 1/13 bias, a characteristic is obtained, in which the reflectance monotonously increases from about 0% to the maximum of about 60% as the applied voltage of the liquid crystal increases to about 2.0 to 2.2 V, as shown in FIG. 6.

FIGS. 4 to 6 indicate that in each of Examples 1 to 6 in which the twist angle θt of the liquid crystal layer 50, Δnd of the liquid crystal layer 50, R2 Δnd of the second retardation plate 116, R1 Δnd of the first retardation plate 106, and the angles θ1 and θ2 are set according to the first embodiment, a reflectance of as high as 20% or more can be obtained to achieve a reflective display having high visual brightness. At the same time, a contrast of as high as 10 or more can be obtained, and a high-quality grayscale display can be obtained due to a sufficient increase in reflectance with the liquid crystal applied voltage.

In various embodiments including this embodiment, each of the first retardation plate 106 and the second retardation plate 116 preferably comprises a biaxial retardation plate and satisfies the condition Nx>Nz>Ny (wherein Nx: refractive index in the X axis direction, Nz: refractive index in the Z axis direction, Ny: refractive index in the Y axis direction). This construction can widen the field of vision. However, even when each of the first retardation plate 106 and the second retardation plate 116 comprises a uniaxial retardation plate, the advantages of the first embodiment can be obtained.

Second Embodiment

A reflective liquid crystal device in accordance with a second embodiment of the present invention is described with reference to FIG. 7. The second embodiment of the present invention is different from the first embodiment in the parameter settings of the first retardation plate 106, the second retardation plate 116, and the polarizer 105, and the other components and operations are the same as the first embodiment shown in FIGS. 1 to 3.

Namely, like in the first embodiment, in the second embodiment, the twist angle θt of the liquid crystal layer 50 comprising a STN liquid crystal is limited to 230 to 260 degrees, the minimum and maximum Δnd of the liquid crystal layer 50 are 0.85 μm or less and 0.70 μm or more, respectively.

Unlike in the first embodiment, in the second embodiment, Δnd of the first retardation plate 106 is 150±50 nm, Δnd of the second retardation plate 116 is 610±60 nm, the angle θ1 formed by the transmission axis or absorption axis of the polarizer 105 and the optical axis of the second retardation plate 116 is 10 to 35 degrees, and the angle θ2 formed by the optical axis of the first retardation plate 106 and the optical axis of the second retardation plate 116 is 30 to 60 degrees. Therefore, in the reflective liquid crystal device of the second embodiment, reflectance for light near the wavelength of 550 nm is increased to permit a bright reflective color display having high contrast. Furthermore, by using the two retardation plates, color correction can be easily and precisely performed, and a beautiful black display or white display (a black or white display without substantially no redness, blueness, greenness, or the like) can be obtained.

Like in the first embodiment, in the second embodiment, since the minimum and maximum Δnd of the liquid crystal layer 50 are 0.85 μm or less and 0.70 μm or more, respectively, a change in transmittance with the applied voltage of the liquid crystal can be made monotonous in a relatively wide operating temperature range, which is required according to the specifications of the device, permitting accurate color grayscale display.

Examples based on the second embodiment are described below with reference to FIG. 7. FIG. 7 is a table showing the twist angle θt of the liquid crystal layer 50, Δnd of the liquid crystal layer 50, Δnd of the second retardation plate 116 (represented by R2 Δnd in the table of FIG. 3), retardation Δnd of the first retardation plate 106 (represented by R1 Δnd in the table of FIG. 3), the angles θ1 and θ2, and brightness (reflectance) and contrast ratio in reflective display in each of Examples 7 to 12. In Examples 7 to 12 shown in FIG. 7, driving is performed in the normally black mode with 1/120 duty and 1/13 bias.

FIG. 7 indicates that in each of Examples 7 to 12 in which the twist angle θt of the liquid crystal layer 50, Δnd of the liquid crystal layer 50, R2 Δnd of the second retardation plate 116, R1 Δnd of the first retardation plate 106, and the angles θ1 and θ2 are set according to the second embodiment, a reflectance of as high as 30% or more can be obtained. Namely, a reflective display having high visual brightness can be obtained. At the same time, a display with a contrast of as high as 10 or more can be obtained.

Third Embodiment

Figure 8:
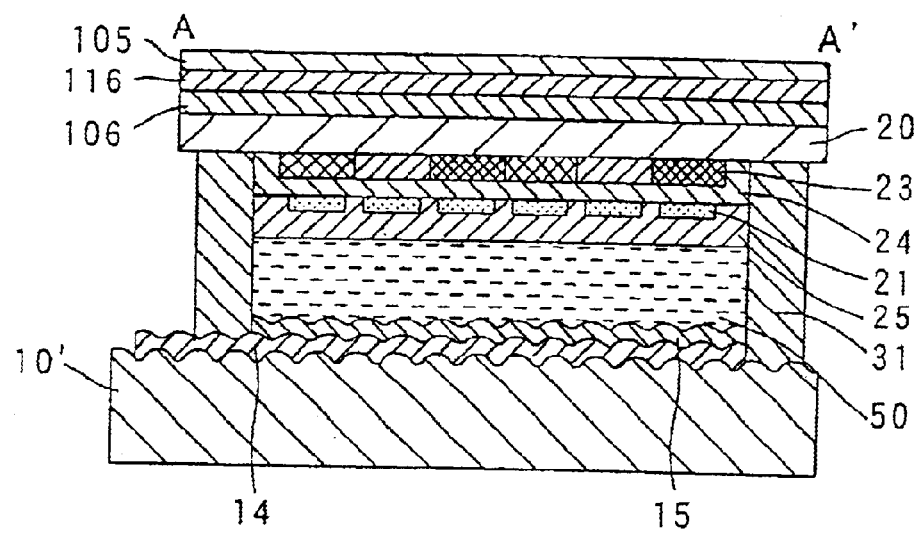
FIG. 8 is a sectional view showing a passive matrix driving system reflective liquid crystal device in accordance with a third embodiment in the best mode for carrying out the present invention.

A reflective liquid crystal device in accordance with a third embodiment of the present invention is described with reference to FIG. 8. In the third embodiment shown in FIG. 8, the same components as the first embodiment shown in FIGS. 1 to 3 are denoted by the same reference numerals as the first embodiment, and description thereof is omitted.

The third embodiment is different from the first or second embodiment in that unevenness is formed on the surface of the first substrate 10 to accordingly form unevenness on the reflecting electrodes 14 and the alignment film 15, and the thickness d of the liquid crystal layer 50 in each pixel slightly changes with position. The other components of the third embodiment are the same as the first or second embodiment.

Therefore, the third embodiment comprises a first substrate 10' having an uneven surface so that each of the reflecting electrodes 14 has an uneven surface facing the liquid crystal layer 50 and thus has a scattering surface (white surface) without a feel of mirror surface. Also, the angle of view can be widened by scattering due to the unevenness. The unevenness can relatively easily be formed by roughening the substrate with hydrofluoric acid. Like in the first or second embodiment, in the third embodiment, the minimum (value at a convex) and maximum (value at a concave) Δnd of the liquid crystal layer 50 are 0.85 μm or less and 0.70 μm or more, respectively. From the viewpoint of prevention of defective orientation of the liquid crystal, it is preferable to form a transparent planarizing film on the uneven surfaces of the reflecting electrodes 14 to planarize the surface (the surface on which the alignment film 15 is formed) facing the liquid crystal layer 50.

Fourth Embodiment

Figure 9:
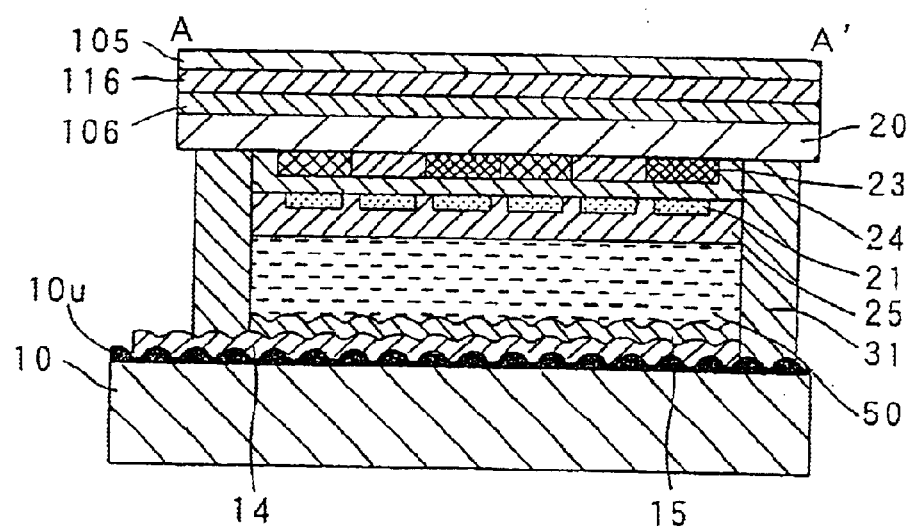
FIG. 9 is a sectional view showing a passive matrix driving system reflective liquid crystal device in accordance with a fourth embodiment in the best mode for carrying out the present invention.

A reflective liquid crystal device in accordance with a fourth embodiment of the present invention is described with reference to FIG. 9. In the fourth embodiment shown in FIG. 9, the same components as the first embodiment shown in FIGS. 1 to 3 are denoted by the same reference numerals as the first embodiment, and description thereof is omitted.

The fourth embodiment is different from the first or second embodiment in that an uneven film is formed on the surface of the first substrate 10 to accordingly form unevenness on the reflecting electrodes 14 and the alignment film 15, and the thickness d of the liquid crystal layer 50 in each pixel slightly changes with position. The other components of the third embodiment are the same as the first or second embodiment.

Therefore, the fourth embodiment comprises an uneven film 10u formed on the first substrate 10 so that like in the third embodiment, each of the reflecting electrodes 14 has an uneven surface facing the liquid crystal layer 50 and thus has a scattering surface (white surface) without a feel of mirror surface. Also, the angle of view can be widened by scattering due to the unevenness. The uneven film 10u can relatively easily be formed by laminating a photosensitive acrylic resin or the like below the reflecting electrodes 14.

Fifth Embodiment

Figure 10:
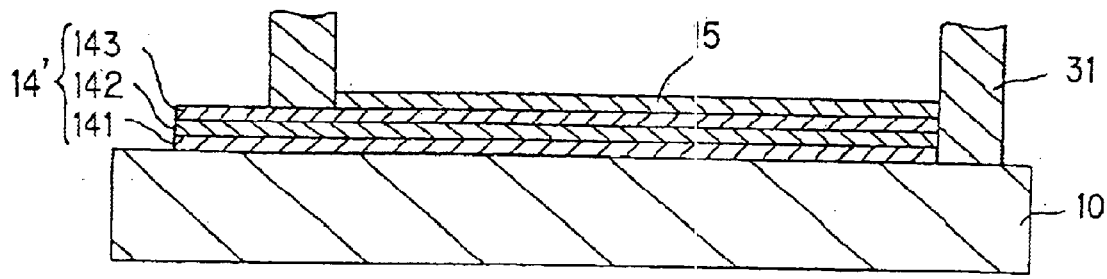
FIG. 10 is a sectional view showing a portion near a reflecting electrode of a reflective liquid crystal device in accordance with a fifth embodiment in the best mode for carrying out the present invention.
Figure 11:
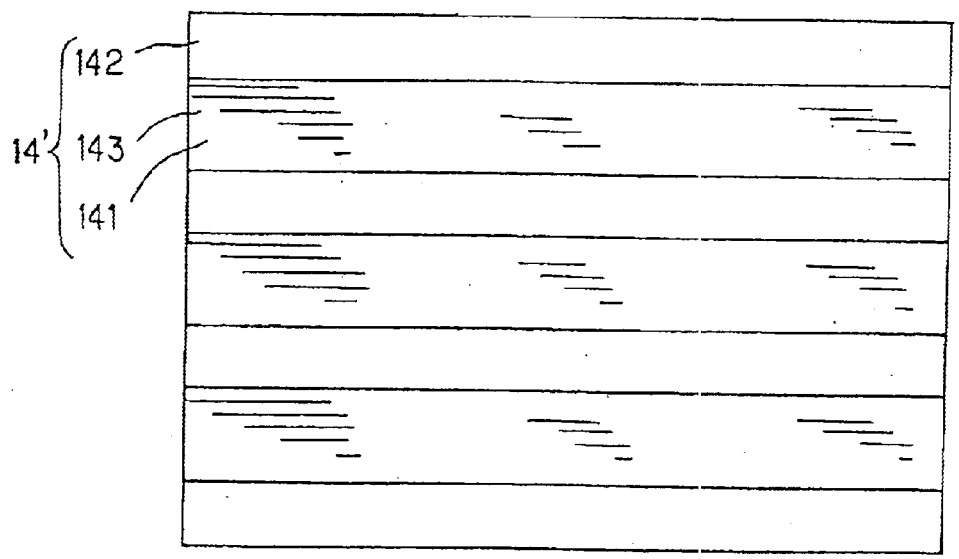
FIG. 11 is a plan view of the reflecting electrode of the fifth embodiment shown in FIG. 10.
Figure 12:
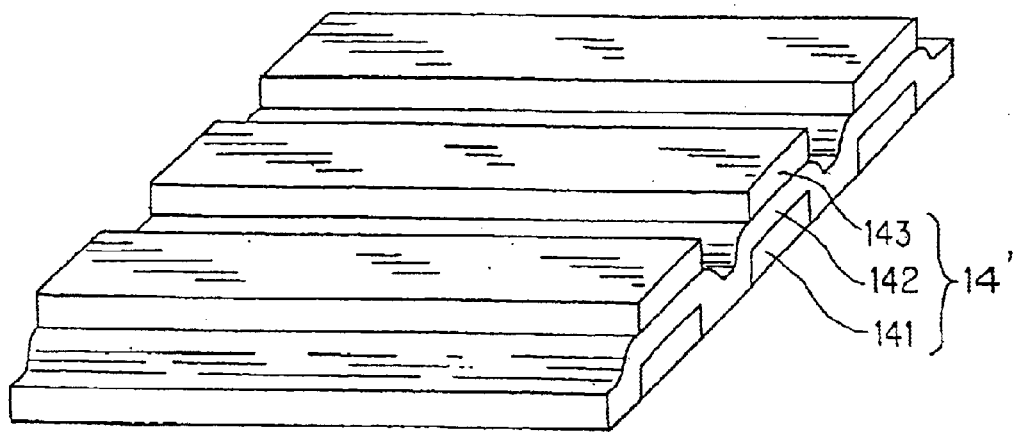
FIG. 12 is a perspective view of the reflecting electrode of the fifth embodiment shown in FIG. 10.

A reflective liquid crystal device in accordance with a fifth embodiment of the present invention is described with reference to FIGS. 10 to 12. FIG. 10 is a sectional view showing the laminated structure of reflecting electrodes 14' of the fifth embodiment, and FIGS. 11 and 12 are a plane and a perspective view, respectively, of the same. In the fifth embodiment shown in FIGS. 10 to 12, the same components as the first embodiment shown in FIGS. 1 to 3 are denoted by the same reference numerals as the first embodiment, and description thereof is omitted.

As shown in FIGS. 10 to 12, in the fifth embodiment, each of the reflecting electrodes 14' has a laminated structure comprising a stripe reflecting film 141, a transparent insulating film 142 arranged on the reflecting film 141, and a stripe transparent electrode 143 arranged on the insulating film 142 instead of the reflecting electrodes 14 each comprising a single layer in the first to fourth embodiments. The other components are the same as any one of the first to fourth embodiments. In this construction, the intensity of external light emitted as display light through the liquid crystal layer 50 after reflection by the reflecting films 141 comprising an Al film or the like can be controlled by controlling the orientation state of the liquid crystal layer 50 using the transparent electrodes 143 comprising an ITO film or the like and laminated on the first substrate 10. In this case, each of the insulating films 142 comprises, for example, silicon oxide as a main component.

Sixth Embodiment

Figure 13:
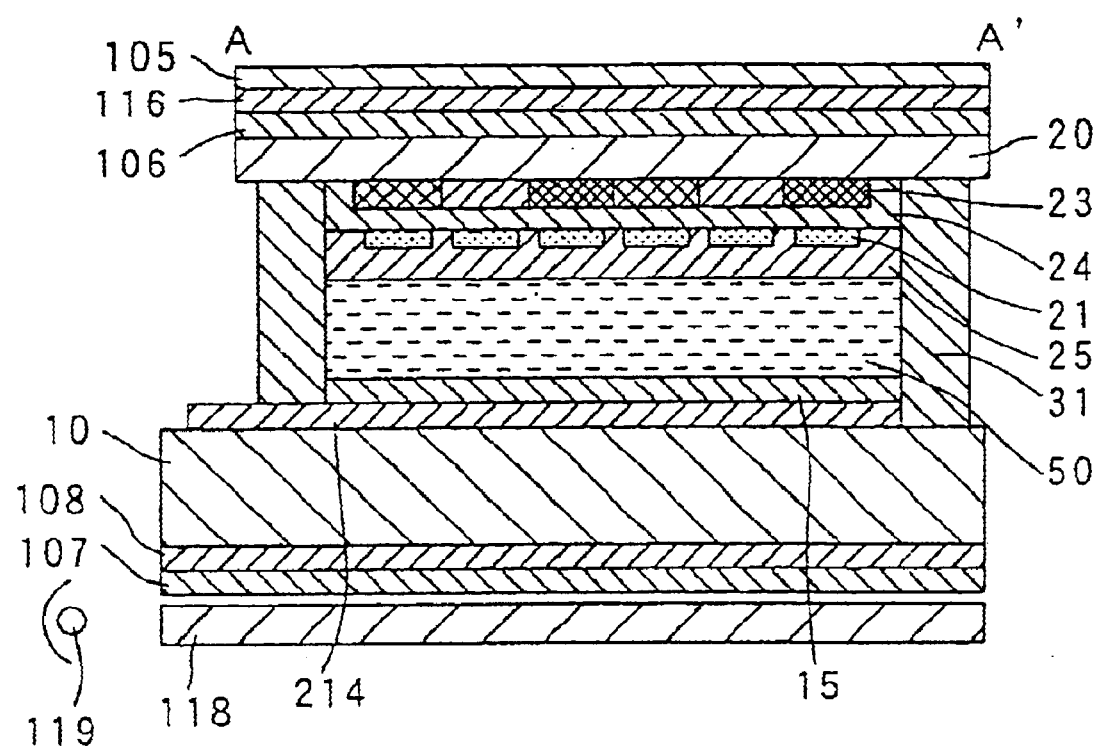
FIG. 13 is a sectional view showing a passive matrix driving system transflective liquid crystal device in accordance with a sixth embodiment in the best mode for carrying out the present invention.

A transflective liquid crystal device in accordance with a sixth embodiment of the present invention is described with reference to FIGS. 13 to 15. In the sixth embodiment, the present invention is applied to a transflective liquid crystal device. FIG. 13 is a schematic sectional view showing the construction of the second embodiment, in which the same components as the first embodiment shown in FIG. 2 are denoted by the same reference numerals as the first embodiment, and description thereof is omitted.

Figure 14:
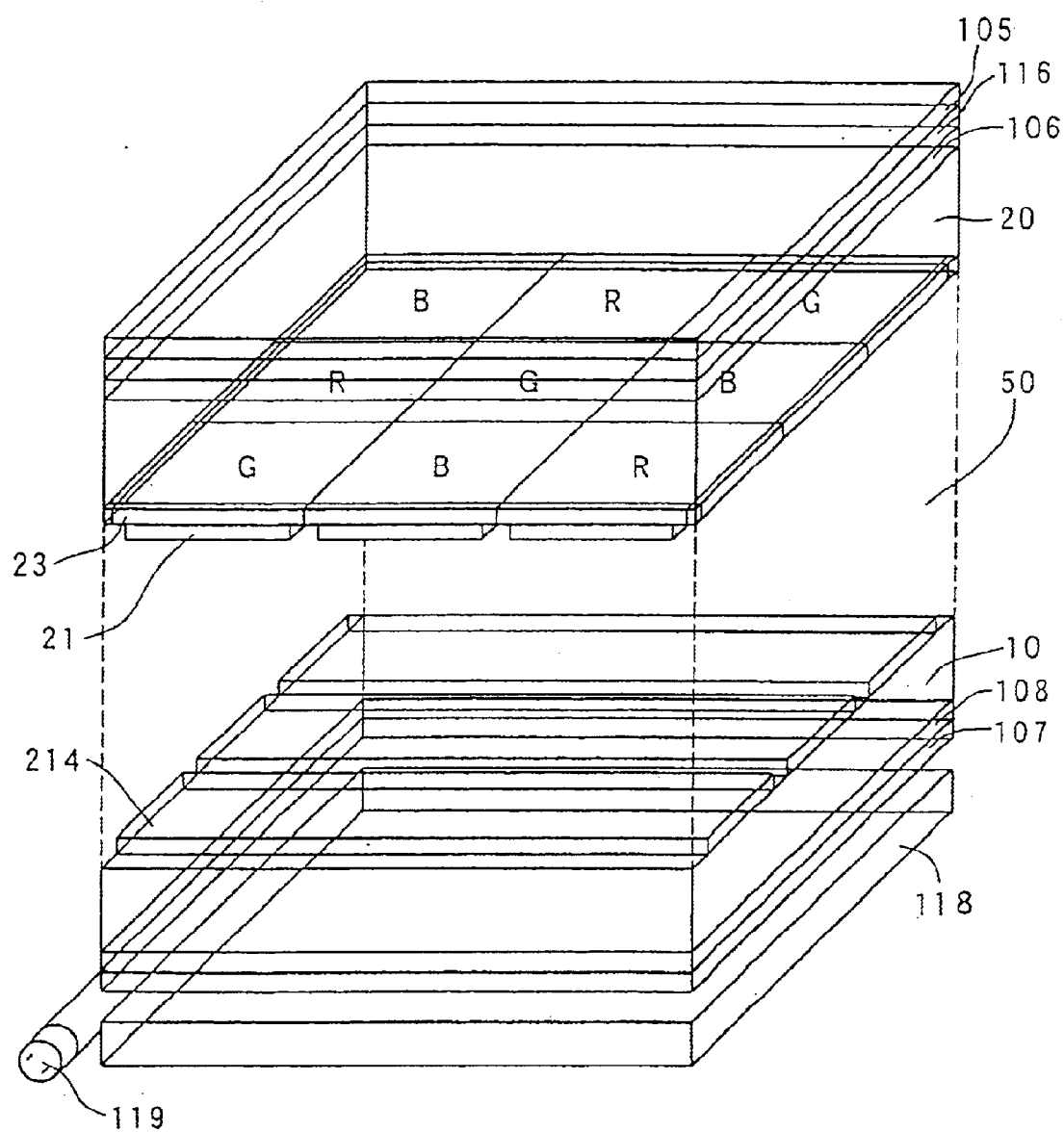
FIG. 14 is a partial perspective view of the transflective liquid crystal device of the sixth embodiment.
Figure 15:
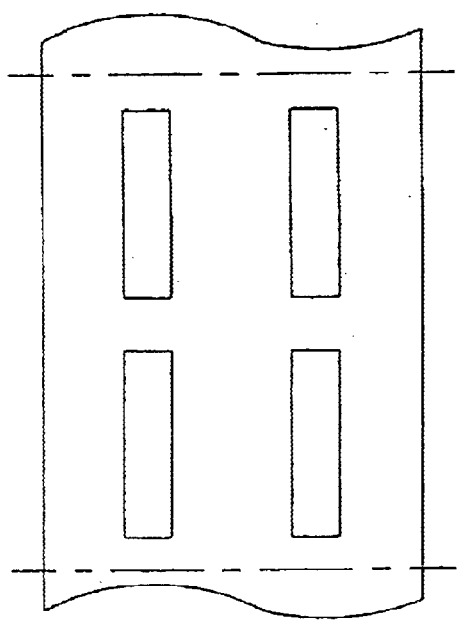
FIG. 15 is an enlarged plan view showing examples of slits and apertures provided in a transflective layer of the sixth embodiment.
Figure 15:
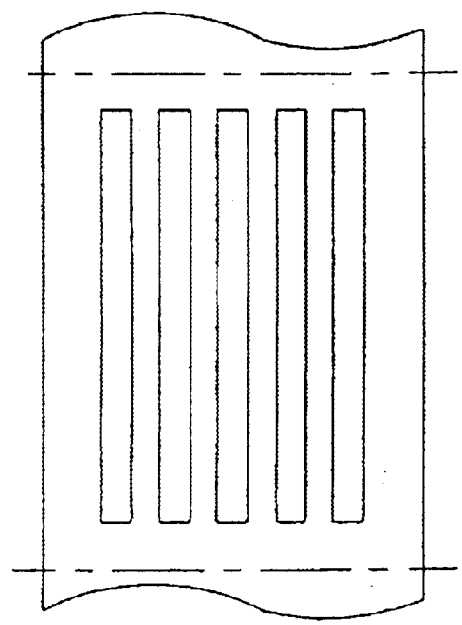
Figure 15:
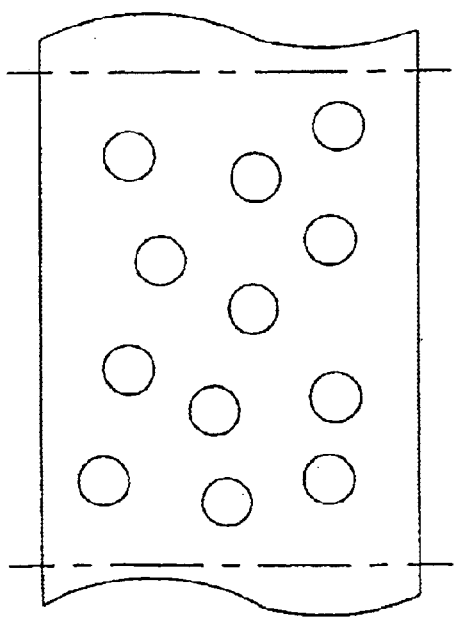
Figure 15:
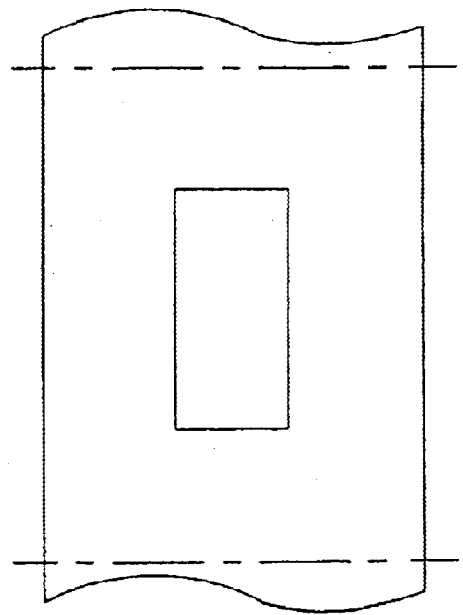

In FIGS. 13 and 14, the transflective liquid crystal device of the sixth embodiment comprises transflective electrodes 214 provided in place of the reflecting electrodes 14 in the first embodiment, and a polarizer 107 and a retardation plate 108 which are provided on the side of the first substrate 10 opposite to the liquid crystal layer 50 side thereof, and which are added to the construction of the first embodiment. The transflective liquid crystal device further comprises a fluorescent tube 119 and a light guide plate 118 for guiding light from the fluorescent tube 119 into the liquid crystal panel through the polarizer 107, both of which are provided outside the polarizer 107. The other components are the same as the first embodiment.

Each of the transflective electrodes 214 comprises a metal such as Ag, Al. and has a slit or aperture. Therefore, the transflective electrodes 214 reflect light incident on the second substrate 20 side and transmit source light incident on the first substrate 10 side.

Examples of the slit or aperture of the transflective electrodes 214 will be described below with reference to FIG. 15.

As shown in FIG. 15(a), four rectangular slots may be arranged at the four corners of each pixel, or as shown in FIG. 15(b), five rectangular slots may be arranged in parallel in the transverse direction in each pixel. Alternatively, as shown in FIG. 15(c), many circular apertures (for example, an aperture having a diameter of 2 μm) may be dispersed in each pixel, or as shown in FIG. 15(d), a relatively large rectangular slot may be arranged in each pixel. Such apertures can be easily formed by a photo step using resist/ development step/separation step. The planar shape of the apertures is not only the shape shown in the drawing but also a square shape, a polygonal shape, an elliptical shape, an irregular shape, or a slit shape extending over a plurality of pixels. The apertures can be formed at the same time as the formation of the reflecting layer, without increasing the number of the manufacturing steps. Particularly, in the slit shown in FIG. 15(a), (b) or (d), the width of the slit is preferably about 3 to 20 μm. In this construction, a bright display with high contrast can be performed in both reflective and transmissive displays. Besides such slits or apertures, for example, the single-layer transflective electrodes 214 may be provided, which are separated in a plan view, as viewed from the direction vertical to the second substrate 20, so that light is transmitted through the spaces between the transflective electrodes 214.

Returning to FIG. 13, the light guide plate 118 which constitutes a back light together with the fluorescent tube 119 comprises a transparent material such as an acrylic resin plate or the like which has a roughened surface formed over the back surface for scattering, or a scattering printed layer formed thereon, so that light of the fluorescent tube 119 serving as a light source is incident on the end surface of the light guide plate 118 and uniformly emitted from the upper side thereof shown in FIG. 13.

As the light source turned on in the transmissive display, a LED (Light Emitting Diode) element, an EL (Electro-Luminescence) element, or the like is suitable for a small liquid crystal device, and the fluorescent tube 119 which introduces light into a device from the side thereof through a light guide plate is suitable for a large liquid crystal device. Furthermore, a reflecting polarizer may be provided between the first substrate 10 and the light guide plate 118, for effectively utilizing light.

In this way, in the sixth embodiment, the polarizer 105, the first retardation plate 106 and the second retardation plate 116 are provided above the liquid crystal cell, and the polarizer 107 and the retardation plate 108 are provided below the liquid crystal cell, thereby permitting good display control in both the reflective and transmissive displays. Specifically, the first retardation plate 106 and the second retardation plate 116 decrease the influence of coloring on a color tone due to wavelength dispersion of light in the reflective display (i.e., optimize a display in the reflective display using the first retardation plate 106 and the second retardation plate 116), and the retardation plate 108 decreases the influence of coloring on a color tone due to wavelength dispersion of light in the transmissive display (i.e., further optimize a display in the transmissive display using the an retardation plate 108 under conditions in which a display is optimized in the reflective display using the first retardation plate 106 and the second retardation plate 116). With respect to the retardation plates, a plurality of retardation plates or at least three retardation plates can be arranged for color compensation or visual angle compensation of the liquid crystal cell. By using a plurality of retardation plates, color compensation or visual angle compensation can be easily optimized.

Furthermore, the optical characteristics of the polarizer 105, the first retardation plate 106, the second retardation plate 116, the liquid crystal layer 50 and the transflective electrodes 214 are set to increase the contrast of the reflective display, and under these conditions, the optical characteristics of the polarizer 107 and the retardation plate 108 are set to increase the contrast of the transmissive display, thereby obtaining a high contrast property in both the reflective and transmissive displays. For example, the optical properties of the polarizer 105, the first retardation plate 106, the second retardation plate 116, the liquid crystal layer 50 and the transflective electrodes 214 are set so that the reflective display is performed under the following conditions. External light passes through the polarizer 105 to become linearly polarized light, and then passes through the retardation plate 106 and the liquid crystal layer 50 with no voltage applied (a dark display state) to become right-handed circularly polarized light and reach the transflective electrodes 214. The light is then reflected by the transflective electrodes 214 to travel in the opposite direction and to be converted to left-handed circularly polarized light, and again passes through the liquid crystal layer 50 with no voltage applied thereto to be converted to linearly polarized light and absorbed by the polarizer 105 (i.e., a dark state). At this time, external light passing through the liquid crystal layer 50 with the voltage applied thereto (a bright display state) passes through the liquid crystal layer 50 without any change, and is reflected by the transflective electrodes 214 to be emitted from the polarizer 105 (i.e., a bright state). On the other hand, in the transmissive display, the optical properties of the polarizer 107 and the retardation plate 108 are set so that source light emitted from the back light and transmitted through the transflective electrodes 214 through the polarizer 107 and the retardation plate 108 becomes the same as left-handed circularly polarized light which is reflected by the transflective electrodes 214 in the reflective display. Although the light source and the optical path are different from the reflective display, like the external light reflected by the transflective electrodes 214 in the reflective display, the source light transmitted through the transflective electrodes 214 in the transmissive display passes through the liquid crystal layer 50 with no voltage applied thereto (a dark display state) to be converted to linearly polarized light and absorbed by the polarizer 105 (i.e., a dark state). At this time, light passing through the liquid crystal layer 50 with the voltage applied thereto (a bright display state) passes through the liquid crystal layer 50 without any change, and is emitted from the polarizer 105 through the liquid crystal layer 50 (i.e., a bright state).

As described above, the liquid crystal device of this embodiment comprises the polarizer 105, the first retardation plate 106, the second retardation plate 116, the polarizer 107 and the retardation plate 108, thereby the achievement of good color compensation and high contrast property in both the reflective and transmissive displays. The optical characteristics can be set experimentally or theoretically or by simulation or the like so as to obtain brightness and contrast ratio which are required according to the specifications of the liquid crystal device.

In the sixth embodiment, particularly, the twist angle θt of the liquid crystal layer 50 comprising a STN liquid crystal is limited to 230 to 260 degrees, and the minimum and maximum Δnd of the liquid crystal are 0.85 μm or less and 0.70 μm or more, respectively. The twist angle θt can be defined with high precision by the direction of rubbing of the alignment film 15 and the alignment film 25. The first retardation plate 106 has a Δnd of 150±50 nm or 600±50 nm, and the second retardation plate 116 has a Δnd of 550±50 nm. The angle θ1 formed by the transmission or absorption axis of the polarizer 105 and the optical axis of the second retardation plate 116 is 15 to 35 degrees, and the angle θ2 formed by the optical axis of the first retardation plate 106 and the optical axis of the second retardation plate 116 is 60 to 80 degrees. Therefore, in the transflective liquid crystal device of the sixth embodiment, the reflectance for light near a wavelength of 550 nm is increased to permit a reflective color display with brightness and high contrast. Furthermore, the use of the two retardation plates enables accurate and easy color correction, and particularly a beautiful black display or white display (i.e., a black display or white display causing no redness, blueness or greenness).

Furthermore, since the minimum and maximum Δnd of the liquid crystal are 0.85 μm or less and 0.70 μm or more, respectively, a change in transmittance with the applied voltage of the liquid crystal device can be made monotonous in a relatively wide operating temperature range which is required according to the specifications of the device, thereby permitting accurate color grayscale display. Although, in this embodiment, the minimum and maximum Δnd of the liquid crystal are 0.85 μm or less and 0.70 μm or more, respectively, the Δnd of the liquid crystal may be simply set to 0.70 μm to 0.85 μm because of the flat uppermost surfaces (i.e. the surface of the alignment film 15 or the reflecting electrodes 14 provided below it) of both substrates, which define the thickness of the liquid crystal. On the other hand, when unevenness is formed on the uppermost surfaces of both substrates, which define the thickness of the liquid crystal, as described in the embodiments below (refer to eighth and ninth embodiments), it is made difficult or impossible to set the $\Delta$nd of the liquid crystal to 0.70 $\mu$m to 0.85 $\mu$m over the entire region of each pixel. In this case, as described above, $\Delta$nd of the liquid crystal may be set so that the minimum and maximum are 0.85 $\mu$m or less and 0.70 $\mu$m or more, respectively.

Next, the operation of the transflective liquid crystal device of the sixth embodiment constructed as described above is described with reference to FIG. 13. The transflective liquid crystal device is driven in a passive matrix driving system in the normally black mode.

The reflective display is first described.

Like in the first embodiment, in the embodiment shown in FIG. 13, external light incident on the polarizer 105 side (i.e., the upper side shown in FIG. 13) is reflected by the transflective electrodes 214 provided on the first substrate 10 through the polarizer 105, the second transparent substrate 20, and the liquid crystal layer 50, and again emitted from the polarizer 105 side through the liquid crystal layer 50, the second transparent substrate 20, and the polarizer 105. When an image signal and scanning signal are supplied to the transflective electrodes 214 and the transparent electrodes 21 from an external circuit with predetermined timing, an electric field is successively applied to the portions of the liquid crystal layer 50 at the intersections of the transflective electrodes 214 and the transparent electrodes 21 for each line, each column or each pixel. Therefore, the orientation state of the liquid crystal layer 50 can be controlled in pixels by the applied voltage to modulate the quantity of light transmitted through the polarizer 105, thereby permitting color grayscale display.

In this embodiment, in a reflective display, the presence of the transparent substrate between the liquid crystal layer and the reflector prevents the occurrence of double exposure, display blurring, or the like to obtain sufficient coloring even in a color display, as compared with a conventional reflective liquid crystal device in which light is reflected by a reflector provided on the outside of the first substrate. Furthermore, in this embodiment, external light is reflected by the transflective electrodes 214 on the upper surface of the first substrate 10, thereby decreasing parallax in a display image by an amount corresponding to a decrease in the optical path and improve the brightness of the display image. Particularly, since the twist angle θt of the liquid crystal layer 50, the angles θ1 and θ2, $\Delta$nd of the liquid crystal layer 50, $\Delta$nd of the first retardation 106 and $\Delta$nd of the second retardation 116 lie in the above-described ranges, a color display having brightness and high contrast can be realized in the normally black mode.

The transmissive display is next described.

In this case, in FIG. 13, source light incident on the lower side of the first substrate 10 through the polarizer 107 passes through the apertures of the transflective electrodes 214 and is emitted from the polarizer 105 side through the liquid crystal layer 50, the second substrate 20 and the polarizer 105. When an image signal and scanning signal are supplied to the transflective electrodes 214 and the transparent electrodes 21 from an external circuit with predetermined timing, an electric field is successively applied to the portions of the liquid crystal layer 50 at the intersections of the transflective electrodes 214 and the transparent electrodes 21 for each line, each column, or each pixel. Therefore, the orientation state of the liquid crystal layer 50 can be controlled in pixels to modulate the source light, thereby permitting color grayscale display.

Like in the first embodiment, in the above-described sixth embodiment, driving LSI comprising a data line driving circuit and a scanning line driving circuit mounted, for example, on a TAB (Tape Automated Bonding) substrate may be electrically and mechanically connected through an anisotropic conductive film, to the terminals of the transflective electrodes 214, which are led to the terminal portion of the first substrate 10, and the terminals of the transparent electrodes 21, which are led to the terminal portion of the second substrate 20. Alternatively, a transflective liquid crystal with so-called built-in driving circuits may be formed. Furthermore, an inspection circuit or the like may be formed to form a transflective liquid crystal with so-called built-in peripheral circuits. Each of the first retardation plate 106 and the second retardation plate 116 may comprise a biaxial retardation plate or a uniaxial retardation plate.

Like in the first embodiment, in the sixth embodiment, besides the passive matrix driving system, various known driving systems such as a TFT (Thin Film Transistor) active matrix driving system, a TFD (Thin Film Diode) active matrix driving system, a segment driving system can be used. In addition, a plurality of stripe or segment transparent electrodes is formed on the second substrate 20, or a transparent electrode is formed over substantially the entire surface of the second substrate 20 according to the driving system. Alternatively, driving may be performed by using transverse electric fields parallel to the first substrate 10, which are produced between the adjacent reflecting electrodes 14 on the first substrate 10, instead of providing the counter electrode on the second substrate 20. Besides the normally black mode, the normally white mode may be utilized. Since, in many cases, the liquid crystal cell has different voltage-reflectance (transmittance) characteristics in the reflective and transmissive displays, the driving voltages in the reflective display and the transmissive display are preferably different in order to optimize each of the displays. Furthermore, micro lenses may be formed on the second substrate 20 in one-to-one correspondence with pixels. Furthermore, many interference layers having different refractive indexes may be formed on the second substrate 20 to form a dichroic filter using light interference for creating RGB colors.

In the sixth embodiment shown in FIG. 13, each of the transflective electrodes 214 comprises a single layer composed of Al as a main component, and thus reflectance can be improved by a relatively simple manufacturing process at relatively low cost. However, even when another metal such as Ag (silver), Cr (chromium), or the like is used as the main component of the transflective electrodes 214, the same effect as the above-described sixth embodiment can be obtained.

Seventh Embodiment

A transflective liquid crystal device in accordance with a seventh embodiment of the present invention is described. The seventh embodiment of the present invention is different from the sixth embodiment in the parameter settings of the first retardation plate 106, the second retardation plate 116, and the polarizer 105, and the other components and operation are the same as the sixth embodiment shown in FIGS. 13 to 15.

Namely, like in the sixth embodiment, in the seventh embodiment, the twist angle θt of the liquid crystal layer 50 comprising a STN liquid crystal is limited to 230 to 260 degrees, the minimum and maximum $\Delta$nd of the liquid crystal layer 50 are 0.85 $\mu$m or less and 0.70 $\mu$m or more, respectively.

Unlike in the sixth embodiment, in the seventh embodiment, Δnd of the first retardation plate 106 is 150±50 nm, Δnd of the second retardation plate 116 is 610±60 nm, the angle θ1 formed by the transmission axis or absorption axis of the polarizer 105 and the optical axis of the second retardation plate 116 is 10 to 35 degrees, and the angle θ2 formed by the optical axis of the first retardation plate 106 and the optical axis of the second retardation plate 116 is 30 to 60 degrees. Therefore, in the transflective liquid crystal device of the seventh embodiment, reflectance for light near the wavelength of 550 nm is increased to permit a bright reflective color display having high contrast. Furthermore, by using the two retardation plates, color correction can be easily and precisely performed, and a beautiful black display or white display (a black or white display without substantially no redness, blueness, greenness, or the like) can be obtained.

Like in the sixth embodiment, in the seventh embodiment, since the minimum and maximum Δnd of the liquid crystal layer 50 are 0.85 μm or less and 0.70 μm or more, respectively, a change in transmittance with the applied voltage of the liquid crystal can be made monotonous in a relatively wide operating temperature range, which is required according to the specifications of the device, permitting accurate color grayscale display.

Eighth Embodiment

Figure 16:
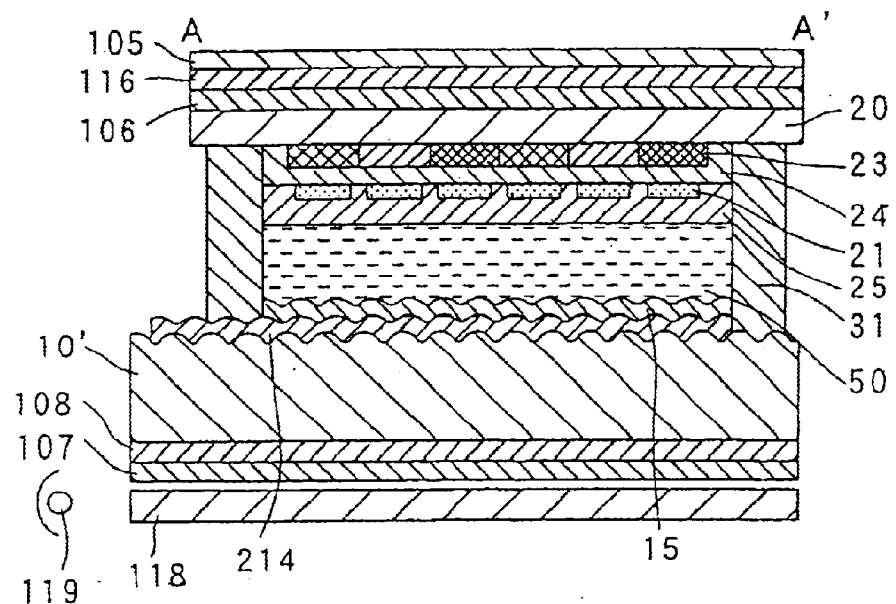
FIG. 16 is a sectional view showing a passive matrix driving system transflective liquid crystal device in accordance with an eighth embodiment in the best mode for carrying out the present invention.

A transflective liquid crystal device in accordance with an eighth embodiment of the present invention is described with reference to FIG. 16. In the eighth embodiment shown in FIG. 16, the same components as the sixth embodiment shown in FIGS. 13 to 15 are denoted by the same reference numerals as the sixth embodiment, and description thereof is omitted.

The eighth embodiment is different from the sixth or seventh embodiment in that unevenness is formed on the surface of the first substrate 10 to accordingly form unevenness on the transflective electrodes 214 and the alignment film 15, and the thickness d of the liquid crystal layer 50 in each pixel slightly changes with position. The other components of the eighth embodiment are the same as the sixth or seventh embodiment.

Therefore, the eighth embodiment comprises a first substrate 10' having an uneven surface so that each of the transflective electrodes 214 has an uneven surface facing the liquid crystal layer 50 and thus has a scattering surface (white surface) without a feel of to mirror surface. Also, the angle of view can be widened by scattering due to the unevenness.

Ninth Embodiment

Figure 17:
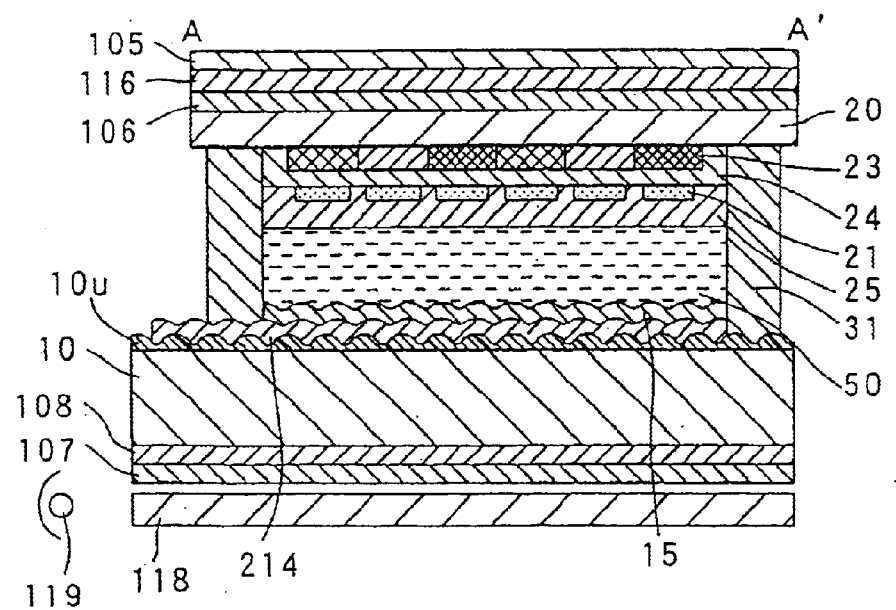
FIG. 17 is a sectional view showing a passive matrix driving system transflective liquid crystal device in accordance with a ninth embodiment in the best mode for carrying out the present invention.

A transflective liquid crystal device in accordance with a ninth embodiment of the present invention is described with reference to FIG. 17. In the ninth embodiment shown in FIG. 17, the same components as the sixth embodiment shown in FIGS. 13 to 15 are denoted by the same reference numerals as the sixth embodiment, and description thereof is omitted.

The ninth embodiment is different from the sixth or seventh embodiment in that an uneven film is formed on the surface of the first substrate 10 to accordingly form unevenness on the transflective electrodes 214 and the alignment film 15, and the thickness d of the liquid crystal layer 50 in each pixel slightly changes with position. The other components of the ninth embodiment are the same as the sixth or seventh embodiment.

Therefore, the ninth embodiment comprises an uneven film 10*u* formed on the first substrate 10 so that like in the eighth embodiment, each of the transflective electrodes 214 has an uneven surface facing the liquid crystal layer and thus has a scattering surface (white surface) without a feel of mirror surface. Also, the angle of view can be widened by scattering due to the unevenness.

Tenth embodiment

Figure 18:
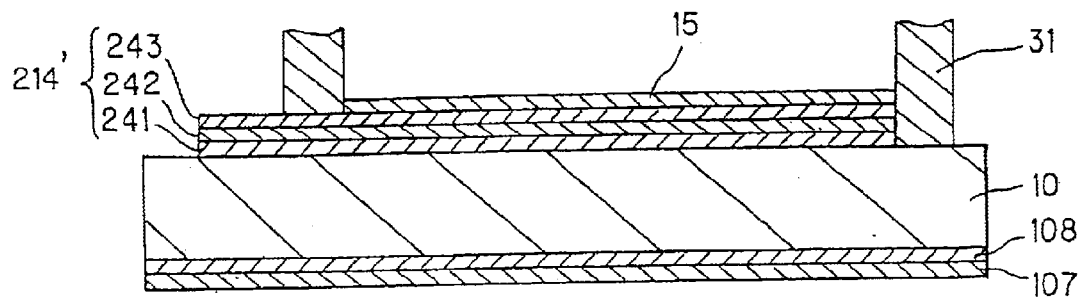
FIG. 18 is a sectional view showing a portion of a transflective electrode of a traneflective liquid crystal device in accordance with a tenth embodiment in the best mode for carrying out the present invention.
Figure 19:
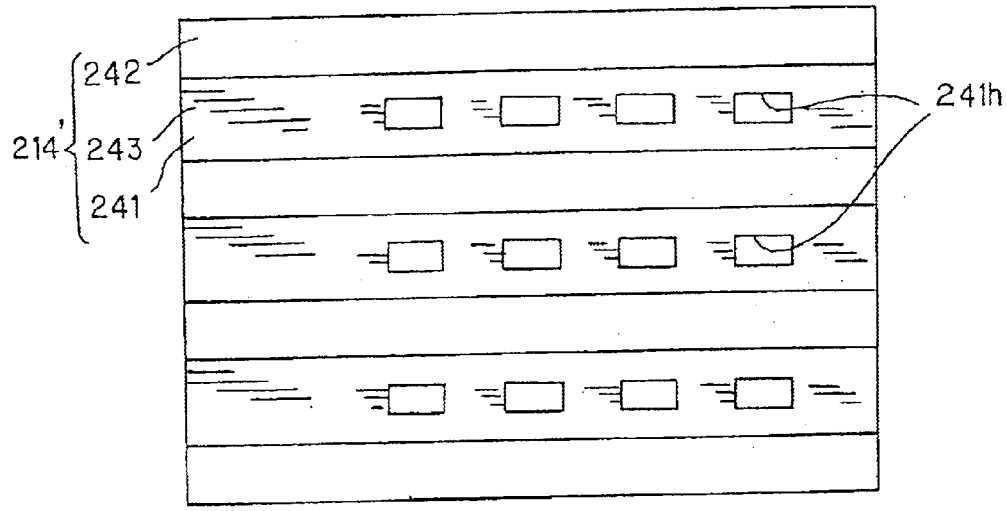
FIG. 19 is a plan view of the transflective electrode of the tenth embodiment shown in FIG. 18.
Figure 20:
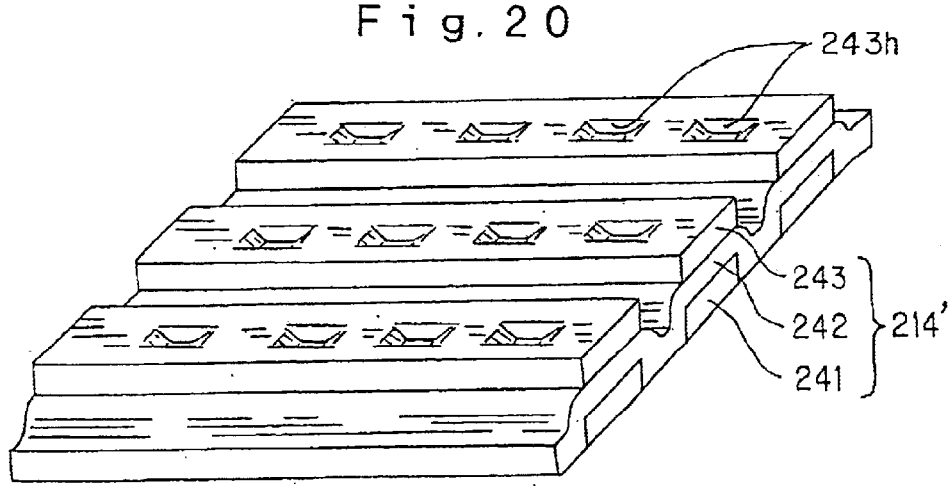
FIG. 20 is a perspective view of the transflective electrode of the tenth embodiment shown in FIG. 18.

A transflective liquid crystal device in accordance with a tenth embodiment of the present invention is described with reference to FIGS. 18 to 20. FIG. 18 is a sectional view showing the laminated structure of transflective electrodes 214' of the tenth embodiment, and FIGS. 19 and 20 are a plane and a perspective view, respectively, of the same. In the tenth embodiment shown in FIGS. 18 to 20, the same components as the sixth embodiment shown in FIGS. 13 to 15 are denoted by the same reference numerals as the sixth embodiment, and description thereof is omitted.

As shown in FIGS. 18 to 20 in the tenth embodiment, each of the transflective electrodes 214' has a laminated structure comprising a stripe transflective film 241, a transparent insulating film 242 arranged on the transflective film 241, and a stripe transparent electrode 243 arranged on the insulating film 242 instead of the transflective electrodes 214 each comprising a single layer in the sixth to ninth embodiments. Each of the transflective films 241 has slits 241*h* formed therein, and recesses 243*h* are accordingly formed in each of the transparent electrodes 243. The other components are the same as any one of the sixth to ninth embodiments.

In this construction, in the reflective display, the intensity of external light emitted as display light through the liquid crystal layer 50 after reflection by the transflective films 241 comprising an Al film or the like can be controlled by controlling the orientation state of the liquid crystal layer 50 using the transparent electrodes 243 comprising an ITO film or the like and laminated on the first substrate 10. In this case, each of the insulating films 242 comprises, for example, silicon oxide as a main component.

Eleventh Embodiment

Figure 21:
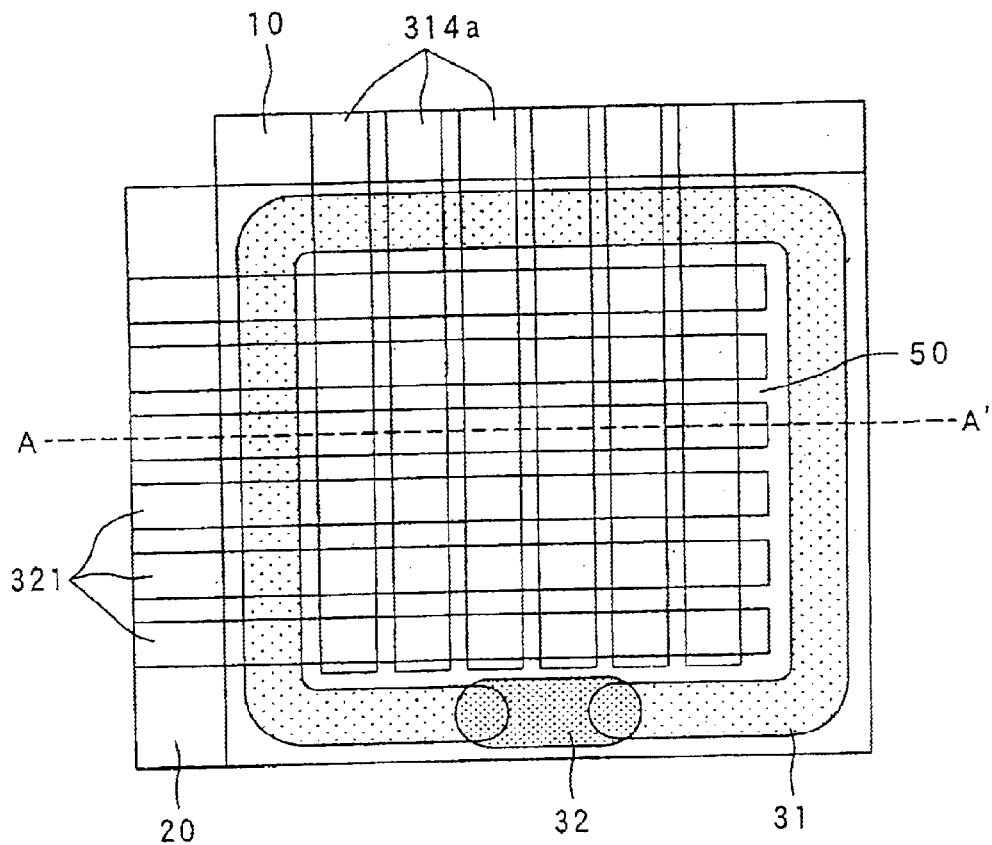
FIG. 21 is a schematic plan view showing a passive matrix driving system reflective liquid crystal device in accordance with an eleventh embodiment in the best mode for carrying out the present invention.
Figure 22:
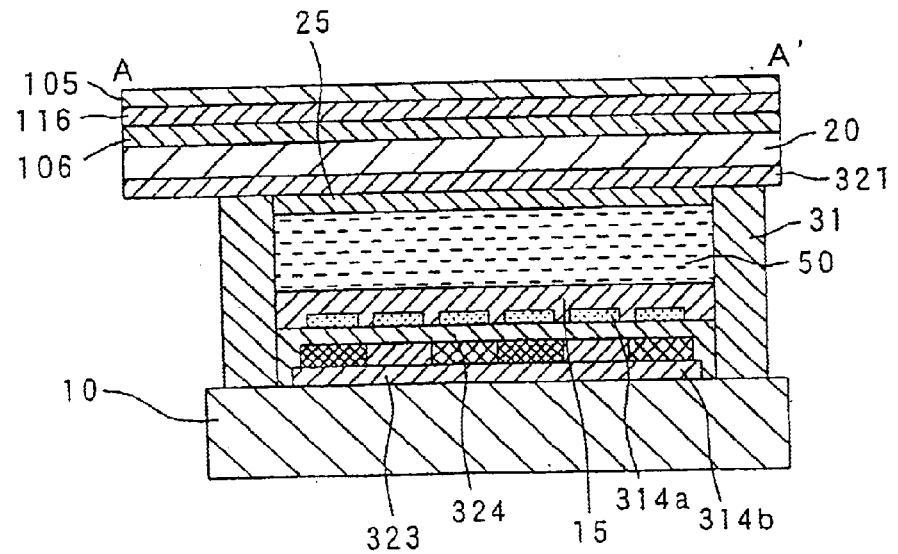
FIG. 22 is a sectional view taken along line A—A– of FIG. 21.
Figure 23:
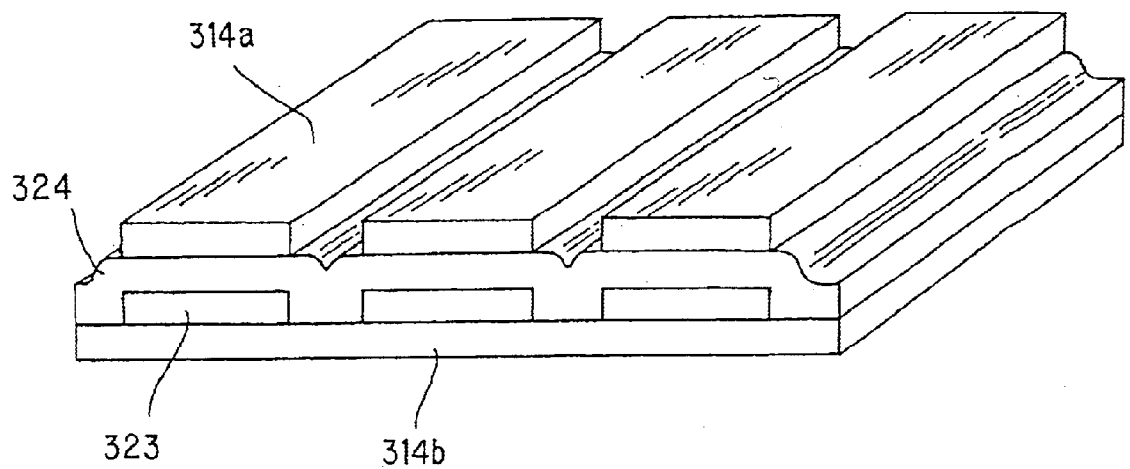
FIG. 23 is partial perspective view showing a structure comprising a reflective electrode and a color filter in the reflective liquid crystal device of the eleventh embodiment.

A reflective liquid crystal device in accordance with an eleventh embodiment of the present invention is described with reference to FIGS. 21 to 23. FIG. 21 is a schematic plan view of the an eleventh embodiment, FIG. 22 is a sectional view taken along line A—A' in FIG. 21, and FIG. 23 is a partial perspective view of the structure of a reflecting electrode layer comprising a color filter incorporated therein in the eleventh embodiment. In the eleventh embodiment shown in FIGS. 21 to 23, the same components as the first embodiment shown in FIGS. 1 to 3 are denoted by the same reference numerals as the first embodiment, and description thereof is omitted.

As shown in FIGS. 21 to 23, the eleventh embodiment is different from the first embodiment in that stripe transparent electrodes 321 extending in the transverse direction in FIG. 21 are provided on the second substrate 20 side, and stripe transparent electrodes 314*a* extending in the longitudinal direction in FIG. 21, a color filter 323, a planarizing film 324 for the color filter 323, and a full reflector 324*b*, which constitutes a reflecting electrode layer together with the transparent electrodes 314*a*, are provided on the first substrate 10 (particularly, the color filter 323 is formed in the reflecting electrode layers). The other components are the same as the first embodiment.

Like in the first embodiment, in the eleventh embodiment having the above construction, the presence of the transparent substrate between the liquid crystal layer and the reflector prevents the occurrence of double exposure, display blurring, or the like to obtain sufficient coloring even in a color display. Furthermore, external light is reflected by reflecting electrodes 314*b* on the upper surface of the first substrate 10, thereby decreasing parallax in a display image to improve the brightness of the display image. Particularly, since the twist angle θt of the liquid crystal layer 50, the angles θ1 and θ2, Δnd of the liquid crystal layer 50, Δnd of the first retardation 106 and Δnd of the second retardation 116 lie in the above-described ranges, a color display having brightness and high contrast can be realized in the normally black mode.

Like in the eleventh embodiment, in a construction in which a color filter is formed on the first substrate 10 in each of the second to tenth embodiments, when the twist angle θt of the liquid crystal layer 50, the angles θ1 and θ2, Δnd of the liquid crystal layer, Δnd of the first retardation 106 and Δnd of the second retardation 116 lie in the above-described ranges, the same effect as the above can be obtained.

Twelfth Embodiment

A twelfth embodiment of the present invention is described with reference to FIG. 24. In the twelfth embodiment, the reflective or transflective liquid crystal device of any one of the first to eleventh embodiments is applied to various electronic apparatuses.

Figure 24A:
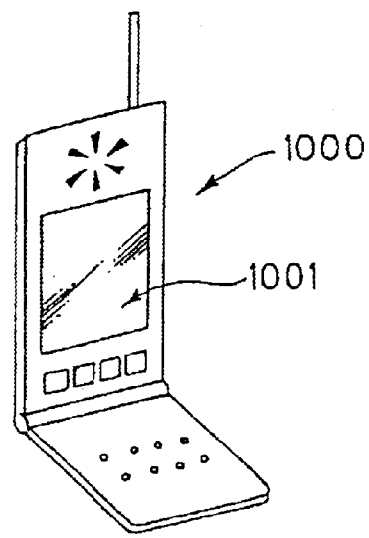
FIG. 24 is a drawing showing the appearance of each of electronic apparatuses in accordance with a twelfth embodiment in the best mode for carrying out the present invention.
Figure 24B:
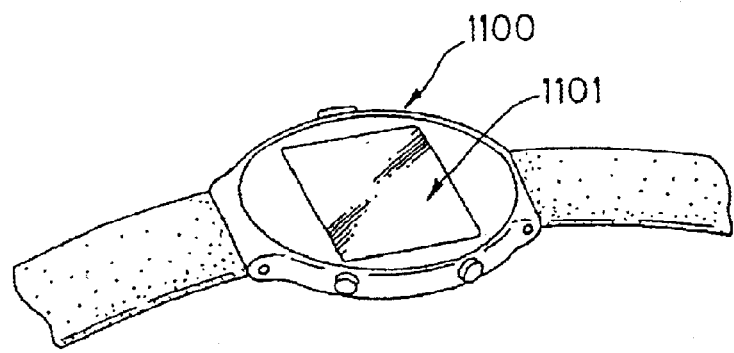
Figure 24C:
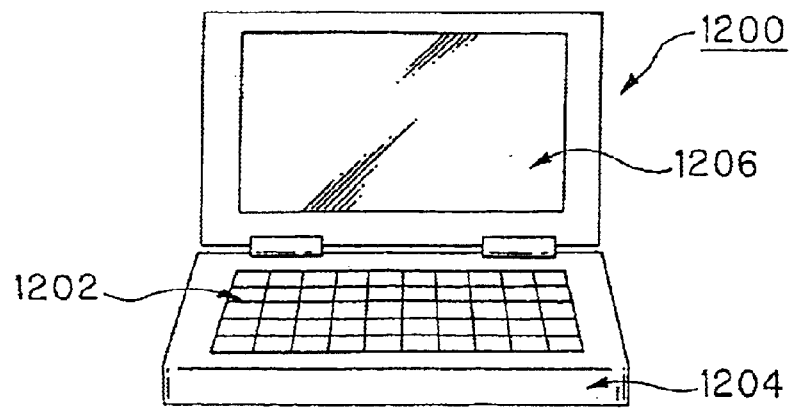

As shown in FIG. 24(*a*), for example, the liquid crystal device of any one of the first to eleventh embodiments is applied to a display region 1001 of a portable telephone 1000, thereby permitting the realization of an energy-saving portable telephone with brightness and high contrast, which causes substantially no parallax and which is capable of performing high-definition color display.

As shown in FIG. 24(*b*), the liquid crystal device is applied to a display region 1101 of a wristwatch 1100 to permit the realization of an energy-saving wristwatch with brightness and high contrast, which causes substantially no parallax and which is capable of performing high-definition color display.

Furthermore, in such a personal computer (or an information terminal) 1200 as shown in FIG. 24(*c*), the liquid crystal device is applied to a display screen 1206 provided in a cover, which is mounted to a body 1204 with a keyboard 1202 so that it can be opened and closed, to permit the realization of an energy-saving personal computer with brightness and high contrast, which causes substantially no parallax and which is capable of performing high-definition color display.

Besides the electronic apparatuses shown in FIG. 24, the reflective or transflective liquid crystal device of any of the first to eleventh embodiments can be applied to other electronic apparatuses such as a liquid crystal television, a view finder type or monitor direct viewing type video tape recorder, a car navigator, an electronic notebook, an electric calculator, a word processor, an engineering work station (EWS), a television telephone, a POS terminal, and a device with a touch panel.

The present invention is not limited to the above embodiments, and appropriate modification can be made in the scope of the gist of the present invention.

INDUSTRIAL APPLICABILITY

A reflective liquid crystal device of the present invention exhibits increased brightness and contrast ratio, and can be used as various display devices with low power consumption suitable for color display. A transflective liquid crystal device of the present invention exhibits increased brightness and contrast ratio, particularly, in reflective display, and can be used as various display devices with low power consumption suitable for color display. Furthermore, the transflective liquid crystal device can be used as a liquid crystal device which constitutes a display region of any of various electronic apparatuses. An electronic apparatus of the present invention can be used as a liquid crystal television, a view finder type or monitor direct-viewing type video tape recorder, a car navigator, an electronic notebook, an electronic calculator, a word processor, a work station, a portable telephone, a television telephone, a POS terminal, a touch panel, or the like, which comprises the above liquid crystal device.

What is claimed is:

1. A transflective liquid crystal device comprising:
   a first transparent substrate;
   a second transparent substrate opposed to the first substrate;
   a liquid crystal held between the first and second substrates;
   a light source provided on a side of the first substrate, which is opposite to the liquid crystal side thereof;
   a transflective electrode layer arranged on the first substrate opposite to the second substrate;
   a polarizer provided on a side of the second substrate, which is opposite to a first substrate side thereof;
   a first retardation plate arranged between the polarizer and the second substrate; and
   a second retardation plate arranged between the polarizer and the first retardation plate;
   wherein a twist angle of the liquid crystal is 230 to 260 degrees;
   a minimum and maximum Δnd (product of optical anisotropy Δn and thickness d) of the liquid crystal are 0.85 μm or less and 0.70 μm or more, respectively;
   Δnd of the first retardation plate is 150±50 nm;
   Δnd of the second retardation plate is 610±60 nm;
   an angle θ1 formed by a transmission axis or absorption axis of the polarizer and an optical axis of the second retardation plate is 10 to 35 degrees; and
   an angle θ2 formed by an optical axis of the first retardation plate and the optical axis of the second retardation plate is 30 to 60 degrees.

2. The transflective liquid crystal device according to claim 1, further comprising a color filter provided on the liquid crystal side of the first or second substrate.

3. The transflective liquid crystal device according to claim 1, wherein the transflective electrode layer comprises a reflecting layer having a slit formed therein.

4. The transflective liquid crystal device according to claim 3, wherein the silt has a width of 3 to 20 μm.

5. The transflective liquid crystal device according to claim 1, wherein the transflective electrode layer has a laminated structure comprising a transflective film, a transparent insulating film arranged on the transflective film, and a transparent electrode arranged on the insulating film.

6. The transflective liquid crystal device according to claim 1, wherein a passive matrix driving system in a normally black mode is used.

7. The transflective liquid crystal device according to claim 1, further comprising:
   another polarizer arranged between the first substrate and the light source; and
   another retardation plate arranged between the first substrate and the polarizer.

8. The transflective liquid crystal device according to claim 1, wherein unevenness is formed on a surface of the first substrate opposite to the second substrate.

9. An electronic apparatus comprising a transflective liquid crystal device according to claim 1.

* * * * *